United States Patent [19]

Shinzawa et al.

[11] Patent Number: 5,195,316
[45] Date of Patent: Mar. 23, 1993

[54] EXHAUST GAS PURIFYING DEVICE FOR AN INTERNAL COMBUSTION ENGINE

[75] Inventors: Motohiro Shinzawa; Shunichi Aoyama, both of Yokosuka; Yoshiki Sekiya; Nobukazu Kanesaki, both of Yokohama, all of Japan

[73] Assignee: Nissan Motor Co., Ltd., Yokohama, Japan

[21] Appl. No.: 629,700

[22] Filed: Dec. 21, 1990

[30] Foreign Application Priority Data

| Dec. 27, 1989 | [JP] | Japan | 1-339041 |
| Dec. 27, 1989 | [JP] | Japan | 1-339042 |
| Dec. 27, 1989 | [JP] | Japan | 1-339043 |
| Dec. 27, 1989 | [JP] | Japan | 1-339044 |

[51] Int. Cl.$^5$ .................................................. F01N 3/02
[52] U.S. Cl. ........................................ 60/274; 60/285; 60/286; 60/288
[58] Field of Search ................ 60/274, 285, 286, 288

[56] References Cited

U.S. PATENT DOCUMENTS

| 4,450,682 | 5/1984 | Sato | 60/286 |
| 4,558,565 | 12/1985 | Kojima | 60/286 |
| 4,698,966 | 10/1987 | Distel | 60/286 |
| 4,835,963 | 6/1989 | Hardy | 60/286 |

FOREIGN PATENT DOCUMENTS

| 10384 | 4/1980 | European Pat. Off. |
| 0220484 | 9/1986 | European Pat. Off. |
| 260031 | 3/1988 | European Pat. Off. |
| 349788 | 1/1990 | European Pat. Off. |
| 3610057 | 10/1986 | Fed. Rep. of Germany |
| 3729857 | 11/1988 | Fed. Rep. of Germany |
| 3723470 | 1/1989 | Fed. Rep. of Germany |
| 58-51235 | 3/1983 | Japan |
| 162713 | 9/1983 | Japan | 60/286 |

OTHER PUBLICATIONS

Patent Abstracts of Japan, vol. 10, No. 66 (M-461) (2123) and Japanese 60-212609.
Patent Abstracts of Japan, vol. 9, No. 238 (M-416) (1961) and Japanese 60-93109.
Patent Abstracts of Japan, vol. 9, No. 264 (M-423) (1987) and Japanese 60-111013.

Primary Examiner—Douglas Hart
Attorney, Agent, or Firm—Lowe, Price, LeBlanc & Becker

[57] ABSTRACT

Parameters which are related to the rate at which particulate matter accumulates and is reburnt, are monitored and the time at which a regeneration is required and/or the length of time a regeneration should be induced, are derived based on the same. The temperature at the inlet and outlet of a trap in which particulate matter is accumulated are monitored and measures such as throttling the induction and exhaust are implement in addition to energizing a heater disposed immediately upstream of the trap as required in order to elevate the trap temperature and to induce and maintain the reburning during a trap regeneration. The pressure differential across the trap can be used to determine the amount of incombustible matter (ash) which has accumulated in the trap and to modify the regeneration timing. When the temperature of the exhaust gases cannot be raised sufficiently, a by-pass is opened to attenuate cooling of the trap by the low temperature gases.

11 Claims, 24 Drawing Sheets

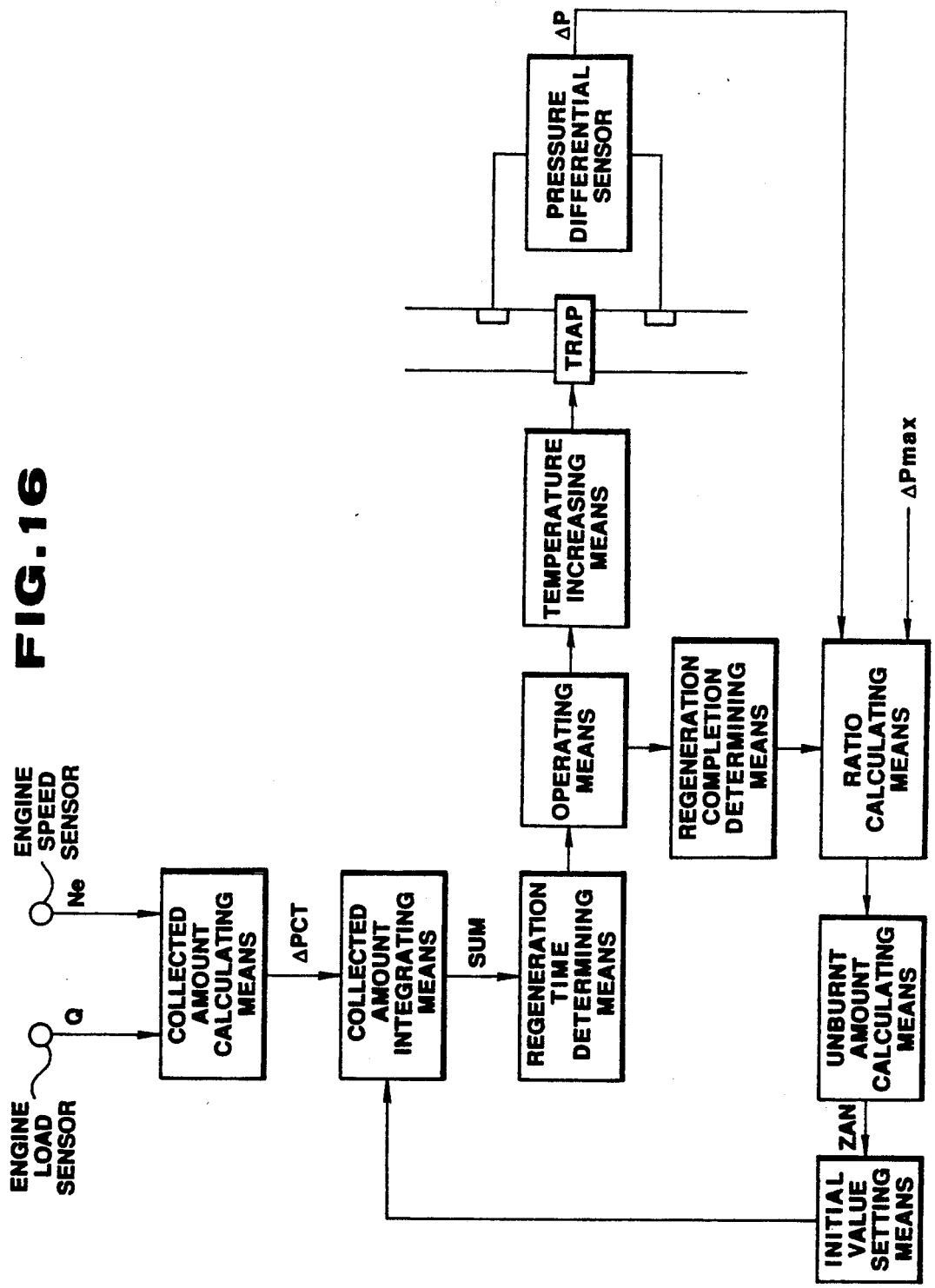

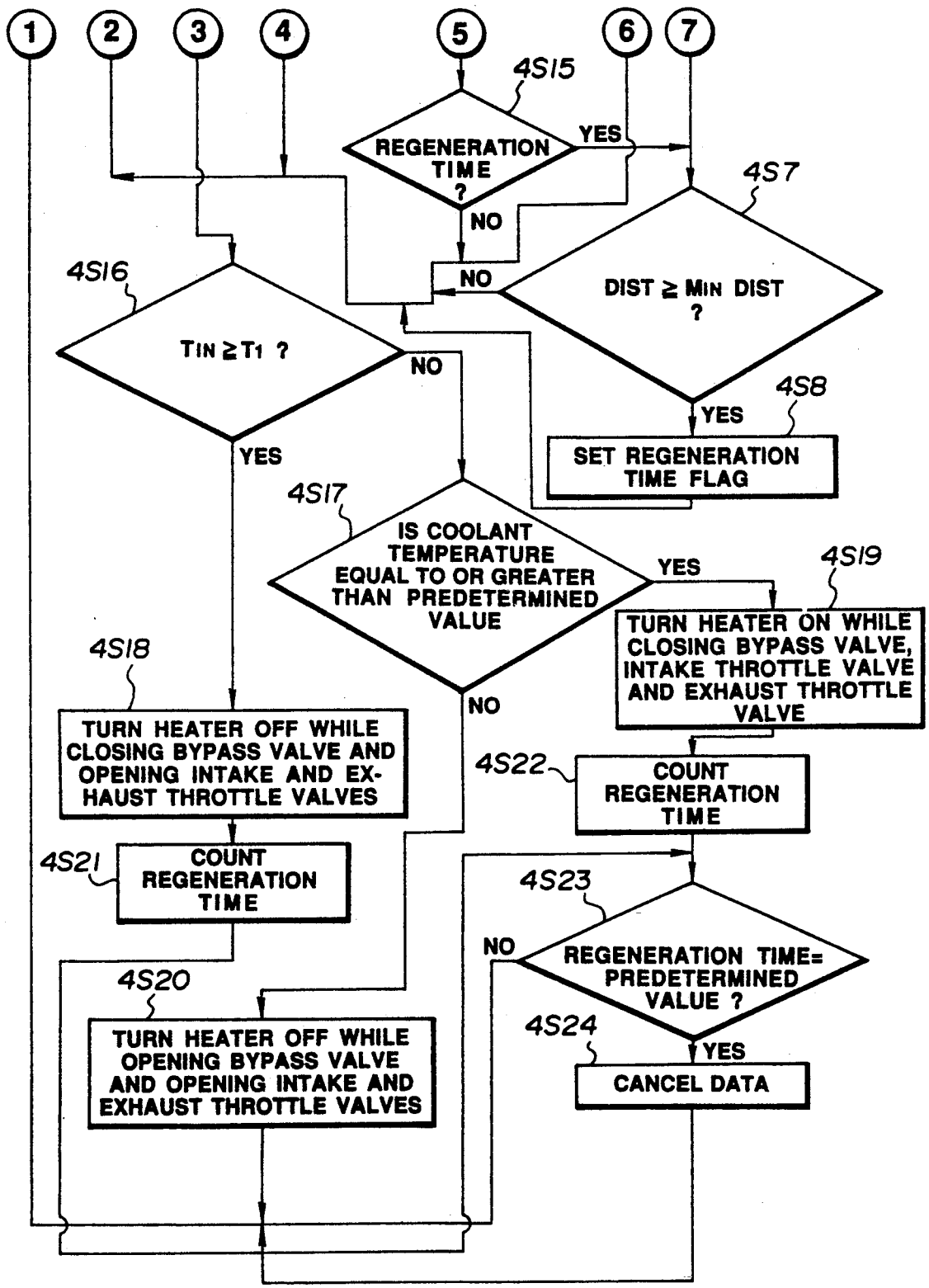

EXHAUST GAS PURIFYING DEVICE FOR AN INTERNAL COMBUSTION ENGINE

BACKGROUND OF THE INVENTION

1. Field of the Invention

The present invention relates generally to an internal combustion engine exhaust system and more specifically to an exhaust gas purifying device for reducing particulate matter emissions.

2. Description of the Prior Art

FIG. 1 shows an exhaust system which is disclosed in JP-A-58-51235 and which includes a trap for removing particulate matter (e.g. minute carbon particles) from the exhaust gases before they are released into the ambient atmosphere.

In this prior proposed arrangement the particulate matter which is contained in the gases exhausted from the combustion chambers of an internal combustion engine 1 into an exhaust conduit 2, are collected in a trap 3. This trap includes a hear resistant filter element (not shown in this figure) which separates the particulate matter from the gases content of the engine exhaust.

The engine includes an induction passage 5 in which a butterfly type throttle valve 6 is disposed. A lever 7 is connected to the shaft of the valve 6 and operatively connected with a diaphragm type vacuum motor 8 by way of a link 8a.

A solenoid valve 9 which controls communication between a vacuum pump 10 and a vacuum chamber 8b of the vacuum motor 8 is operatively connected with a control unit 15. This latter mentioned unit is connected with a fuel injection pump 11 and arranged to receive a load indicative signal produced by a load sensor 13 and an engine speed sensor 13. In this instance both of the sensors are associated with the pump 11 as shown. The control unit 15 is also connected with an induction pressure sensor 14 in a manner to receive a signal indicative thereof.

The control unit 15 is arranged to determine the timing with which the trap 3 should be regenerated based on either time or distance travelled. Upon such a determination being made, the control unit determines if the engine is operating in a predetermined engine speed/load range by selectively sampling the outputs above mentioned sensors.

Given that the engine is operating in the predetermined speed/load range, the control unit issues a signal to the solenoid which induces the throttle valve to partially close. The degree to which the throttle valve is closed and induction is throttled is feedback controlled based on the output of the induction pressure sensor 14. This feedback control is such as to adjust the duty cycle of the solenoid driver signal in a manner to establish an essentially constant negative induction pressure in the induction manifold downstream of the throttle valve 6.

When the amount of air which is inducted into the engine is reduced in this manner, the temperature of the exhaust gases is increased, the temperature of the trap rises and the particulate matter collected in the trap 3 is induced to combust (viz., undergo re-burning). With this arrangement the regeneration is conducted for either a predetermined time or distance.

However, this arrangement has suffered from the drawback that trap regeneration sometimes does not proceed as expected.

One reason for this comes in that the rate of particulate accumulation varies markedly with the manner in which the driver operates the engine, the altitude, engine load, engine and ambient temperature, fuel pump settings, age of the engine, etc. Accordingly, if the regeneration is induced at regular intervals (based on either time or distance) it sometimes occurs that an abnormally large amount of particulate matter accumulates between regeneration.

This leads to a serious problem that the amount of accumulated particulate matter sometimes exceeds a critical level. Accordingly, during a regeneration, overly intense combustion tends to occur. This raises the temperature of the trap beyond its thermal limits and induces a damaging melt-down or like.

In the event that the frequency of the regenerations is increased to ensure that a critical amount combustible matter cannot accumulate, the frequent arbitrary closing of the throttle valve deteriorates both engine performance and fuel economy.

Further reasons for the unstable trap regeneration come in that during a regeneration, the exhaust gas temperature varies with the ambient air pressure and other driving conditions, and as a result of the reduced air induction which raises the exhaust temperature, the amount of particulate which is contained in the exhaust gases increases. Accordingly, if the exhaust gas temperature is not raised to the levels expected, the regeneration efficiency drops off and it sometimes occurs that the amount of accumulation during the re-generation, at least in part, replaces that actually being combusted and the amount of combustible particulate matter retained in the trap 3 immediately following the termination of the regeneration can be substantial and/or essentially the same as initially contained therein.

This also leads to the problem that the amount of accumulated particulate matter sometimes exceeds a critical level and results in the above mentioned damagingly intense combustion.

In view of the above, it has also been proposed to monitor the pressure differential which exists across the trap and to trigger the regeneration upon a given back pressure developing. However, it has been found that the accumulation of incombustible matter such as metal oxides (resulting from the combustion of additive containing lubricants etc) in the trap render this technique of determining the amount of combustible particulate matter unreliable.

SUMMARY OF THE INVENTION

It is an object of the present invention to provide a trap regeneration control arrangement which monitors the parameters which effect the accumulation and reburning rates and which enables the regeneration to be timed in a manner which obviates the above mentioned thermal damage and attenuates marked power and economy losses.

In brief, the above object is achieved by an arrangement wherein parameters which are related to the rate at which particulate matter accumulates and is reburnt, are monitored and the time when a regeneration is required and/or the length of time a regeneration should be induced, are derived based on the same. The temperature at the inlet and outlet of a trap in which particulate matter is accumulated are monitored and measures such as throttling the induction and exhaust are implement in addition to energizing a heater disposed immediately upstream of the trap as required in order to elevate the trap temperature and to induce and maintain the reburning during a trap regeneration.

The pressure differential across the trap can be used to determine the amount of incombustible matter (ash) which has accumulated in the trap and to modify the regeneration timing.

More specifically, a first aspect of the present invention is deemed to come in an exhaust gas purifying system for an internal combustion engine, which features: a trap which is disposed in an exhaust conduit and in which particulate matter contained in the gases which flow through the conduit, can be collected; sensor means for sensing parameters which are related to the rate and/or amount of particulate matter collected in the trap and the conditions which prevail in the trap; means for deriving an approximation of the amount of particulate matter collected and/or burnt in the trap based on output from the sensor means; and means for selectively increasing the temperature in the trap to a level whereat combustion of the combustible fraction of the particulate matter collected therein is induced, in the event that a regeneration is indicated as being required and the temperature of the gases entering the trap are insufficient to induce spontaneous combustion.

A second aspect of the invention is deemed to come in an internal combustion engine which features: a first engine speed sensor; a second engine load sensor; a third engine temperature coolant sensor; an induction passage; a first servo controlled flow control valve disposed in the induction passage for restricting the amount of air passing therethrough; an exhaust conduit; a second servo controlled flow control valve disposed in the exhaust conduit for restricting the flow of gas therethrough; a trap disposed in the exhaust conduit downstream of the second valve, the trap being arranged to separate and collect particulate matter contained in the gases which flow through the exhaust conduit; a heater disposed in the exhaust passage immediately upstream of the trap; a by-pass passage having an upstream end fluidly communicated with the exhaust passage at a location upstream of the second valve and a downstream end communicating with the exhaust passage a location downstream of the trap; a third servo controlled flow control valve disposed in the by-pass passage for restricting the flow of gas therethrough; a fourth temperature sensor for sensing the temperature of the gases entering the trap; a fifth temperature sensor for sensing the temperature of the gases coming out of the trap; a sixth pressure differential sensor for sensing a pressure differential which prevails across the upstream and downstream ends of the trap; a control unit operatively connected with the heater, the first to sixth sensors and the first to third flow control valves, the control unit including circuitry which includes means for: deriving an approximation of the amount of particulate matter collected and/or burnt in the trap based on output from the sensor means; and selectively operating the heater and the first to third flow control valves in a manner which increases the temperature in the trap to a level whereat combustion of the combustible fraction of the particulate matter collected therein is induced, in the event that a regeneration is indicated as being required and the temperature of the gases entering the trap are insufficient to induce spontaneous combustion.

A third aspect of the present invention is deemed to comprise a method of operating an exhaust gas purifying system which includes a trap in which particulate matter contained in the gases exhausted from an internal combustion engine can be collected, the method featuring the steps of: sensing engine speed using a first sensor; sensing engine load using a second sensor; sensing the temperature of the engine coolant using a third sensor; separating and collecting particulate matter in the gases which flow through the exhaust gas conduit, using the trap; sensing the temperature of the exhaust gases at the upstream and downstream ends of the trap using fourth and fifth sensors; sensing the pressure differential which develops between the upstream and downstream ends of the trap using a sixth sensor; using the outputs of the first to sixth sensors to derive an approximation of the amount of particulate matter collected and/or burnt in the trap; and selectively increasing the temperature of the exhaust gases in the event that regeneration is indicated as being required and the temperature of the gases entering the trap are insufficient to induce spontaneous combustion.

A further aspect of the present invention comes in an exhaust gas purifying system which features: a trap in which particulate matter contained in the gases exhausted from an internal combustion engine is separated and collected; first sensor means for sensing engine speed; second sensor means for sensing engine load; third sensor means for sensing the temperature of the engine coolant; fourth sensor means sensing the temperature of the exhaust gases at the upstream and downstream ends of the trap; fifth sensor means for sensing the pressure differential which develops between the upstream and downstream ends of the trap; means for using the outputs of the first to fifth sensor means to derive an approximation of the amount of particulate matter collected and/or burnt in the trap; and means for selectively increasing the temperature of the exhaust gases in the event that regeneration is indicated as being required and the temperature of the gases entering the trap are insufficient to induce spontaneous combustion.

A fifth aspect of the invention is deemed to comprise an exhaust purifying system wherein a trap is used to separate and collect particulate matter contained in the gases exhausted from an internal combustion engine and which features: means for sensing the trap containing a predetermined amount of particulate matter and for arbitrarily implementing measures which raise the temperature of the exhaust gases to a level whereat the particulate matter will undergo reburning; means for determining which of a plurality of engine speed/load zones an engine associated with the exhaust purifying system is operating in; means for approximating the amount of particulate matter which is being produced per unit time and which will be collected in the trap based on the engine speed/load zone the engine is determined to be operating in; means for sensing the temperature of the gases being exhausted from the trap and for approximating the amount of particulate matter which is being reburnt per unit time; means for determining the effective reduction in particulate matter contained in the trap based on the amount of particulate matter which is being produced per unit time and the amount of particulate matter which is being reburnt per unit time, and for determining when the amount of particulate matter contained in the trap has reached a predetermined level and the measures which raise the temperature of the exhaust gases to a level whereat the particulate matter will undergo reburning, can be stopped.

Another aspect of the present invention is deemed to be an exhaust purifying system wherein a trap is used to separate and collect particulate matter contained in the gases exhausted from an internal combustion engine, the system featuring: means for determining if an engine associated with the purifying system is operating in a first mode which will produce an exhaust gas temperature sufficiently high to induce reburning of the particulate matter collected in the trap, or in a second mode which will produce an gas temperature insufficiently high to induce reburning of the particulate matter collected in the trap; means for decreasing an accumulation value indicative of the amount of particulate matter retained in the trap when the engine is determined to be operating in the first mode and for increasing the accumulation value when the engine is determined to be operating in the second mode; means for determining that trap regeneration is required when the accumulation value reaches a predetermined limit.

A further aspect of the present invention is deemed to comprise a an exhaust purifying system wherein a trap is used to separate and collect particulate matter contained in the gases exhausted from an internal combustion engine, the system featuring:means for adding the amount of particulate matter which is being produced per unit time to a base value and for deriving the amount of particulate matter which is being effectively accumulated in the trap based on the operation of an engine associated with the purifying system; means for inducing trap regeneration when a predetermined amount of particulate matter is determined to have been accumulated; means for sensing the pressure differential which exists across the trap following a regeneration, using the sensed pressure differential with a predetermined limit value to determine a ratio; means for using the ratio to determine the amount of unburnt particulate matter retained in the trap following a regeneration and for using this as the base value to which the amount of particulate matter which is being produced per unit time, is added.

A still further aspect of the present invention is deemed to come in an exhaust purifying system wherein a trap is used to separate and collect particulate matter contained in the gases exhausted from an internal combustion engine, the system featuring:means for monitoring a plurality of engine operational parameters and for estimating based on the monitored parameters the amount particulate matter which is effectively collected per unit time; means for integrating the amount particulate matter which is effectively collected per unit time and for estimating the amount of particulate matter in the trap; means for arbitrarily increasing the temperature of the exhaust gases to a predetermined temperature whereat combustion of the combustible particulate matter which is collected in the trap is induced in the event that the integrating means indicates that a predetermined amount of particulate matter has accumulated in the trap.

Another aspect of the present invention is deemed to come in an exhaust purifying system wherein a trap is used to separate and collect particulate matter contained in the gases exhausted from an internal combustion engine, the system featuring:means for arbitrarily increasing the temperature of the exhaust gases to a predetermined level whereat combustion of the combustible particulate matter which is collected in the trap, is induced; means for monitoring a plurality of engine operational parameters and for estimating, based on the monitored parameters, the amount by which the particulate matter in the trap is effectively reduced per unit time; means for integrating the amount by which the particulate matter in the trap is reduced per unit time and for estimating when the collected amount of particulate matter has been reduced to a predetermined level; and means for stopping the arbitrary temperature increase when it is estimated that the collected amount of particulate matter has been reduced to the predetermined level.

A still another aspect of the present invention is deemed to be an exhaust purifying system wherein a trap is used to separate and collect particulate matter contained in the gases exhausted from an internal combustion engine, the system including:means for monitoring a plurality of engine operational parameters and for estimating, based on the monitored parameters, the amount by which the particulate matter in the trap is effectively accumulated per unit time; means for integrating the amount by which the particulate matter in the trap is reduced per unit time, for estimating when the collected amount of particulate matter has been reduced to a predetermined level, and for setting a first regeneration interval; means for sensing the pressure differential which exists across the trap and for setting a second regeneration interval in accordance with the sensed pressure differential; and means for arbitrarily increasing the temperature of the gases entering the trap in accordance with the shorter of the first and second generation intervals.

BRIEF DESCRIPTION OF THE DRAWINGS

FIG. 16 is a block diagram showing the conceptual arrangement of a third embodiment of the present invention;

FIGS. 22 and 23 show threshold levels which are used in connection with the control of the fourth embodiment;

FIGS. 25A and 25B show in flow chart form the operations which are performed when implementing the control of the fourth embodiment.

DETAILED DESCRIPTION OF THE PREFERRED EMBODIMENTS

Figure 1:
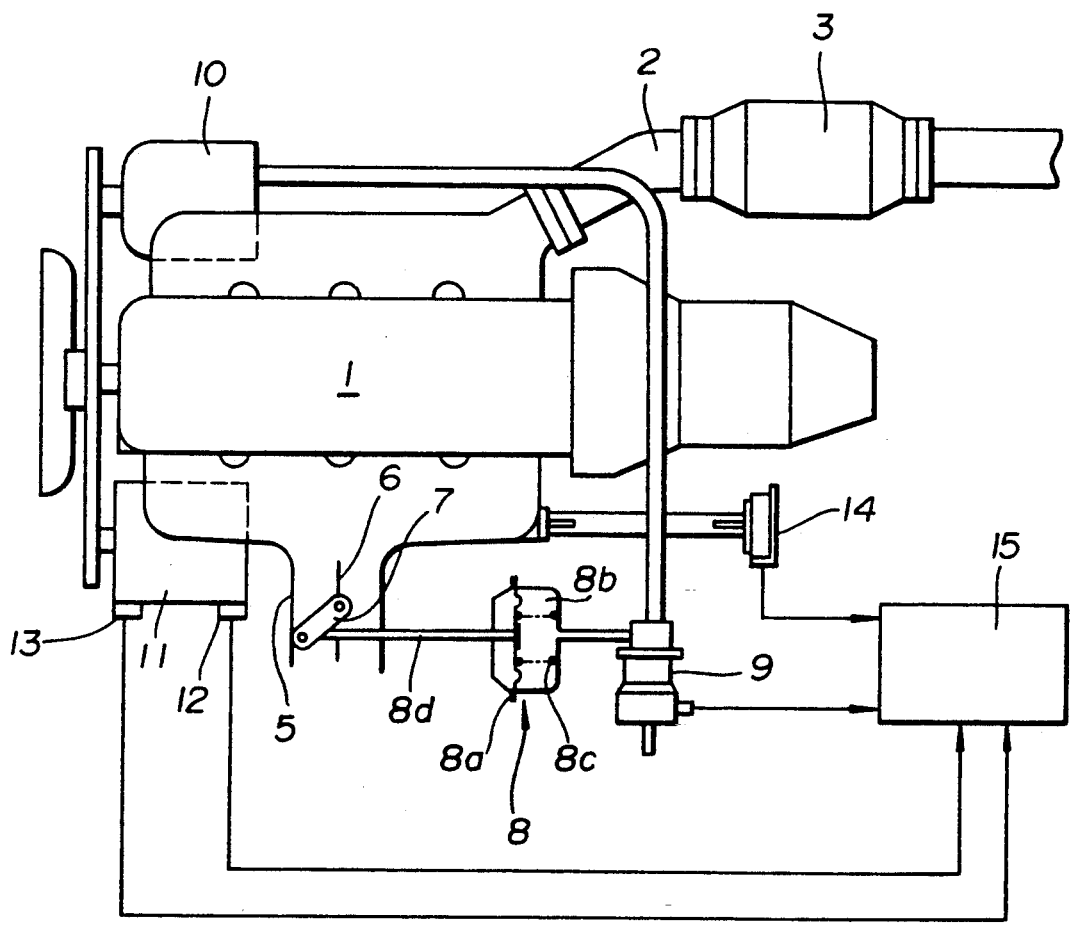
FIG. 1 is a plan view of the prior art arrangement discussed in the opening paragraphs of the instant disclosure.
Figure 2:
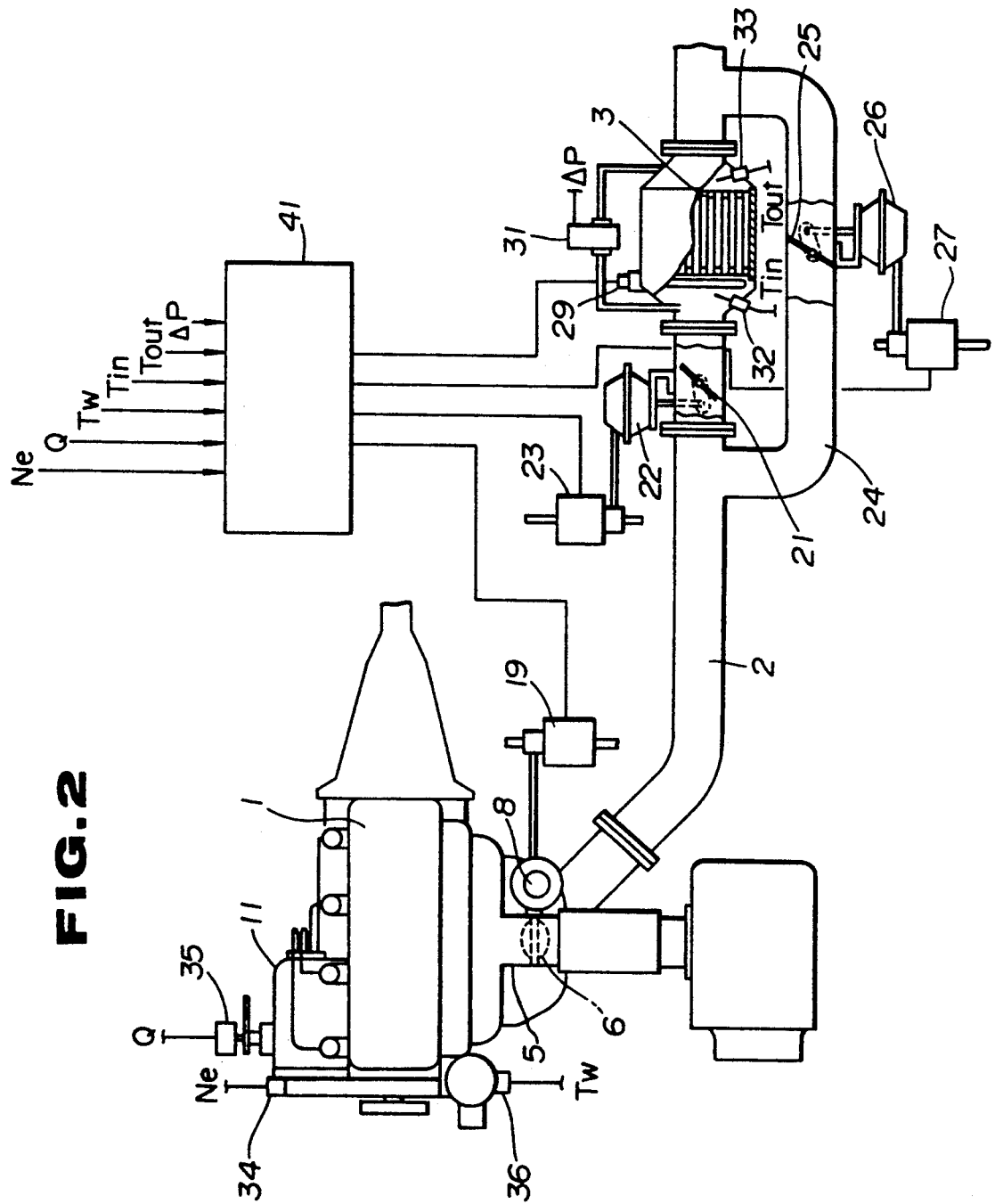
FIG. 2 is a plan view showing an engine system equipped with a particulate trap and regeneration system according to the present invention.
Figure 3:
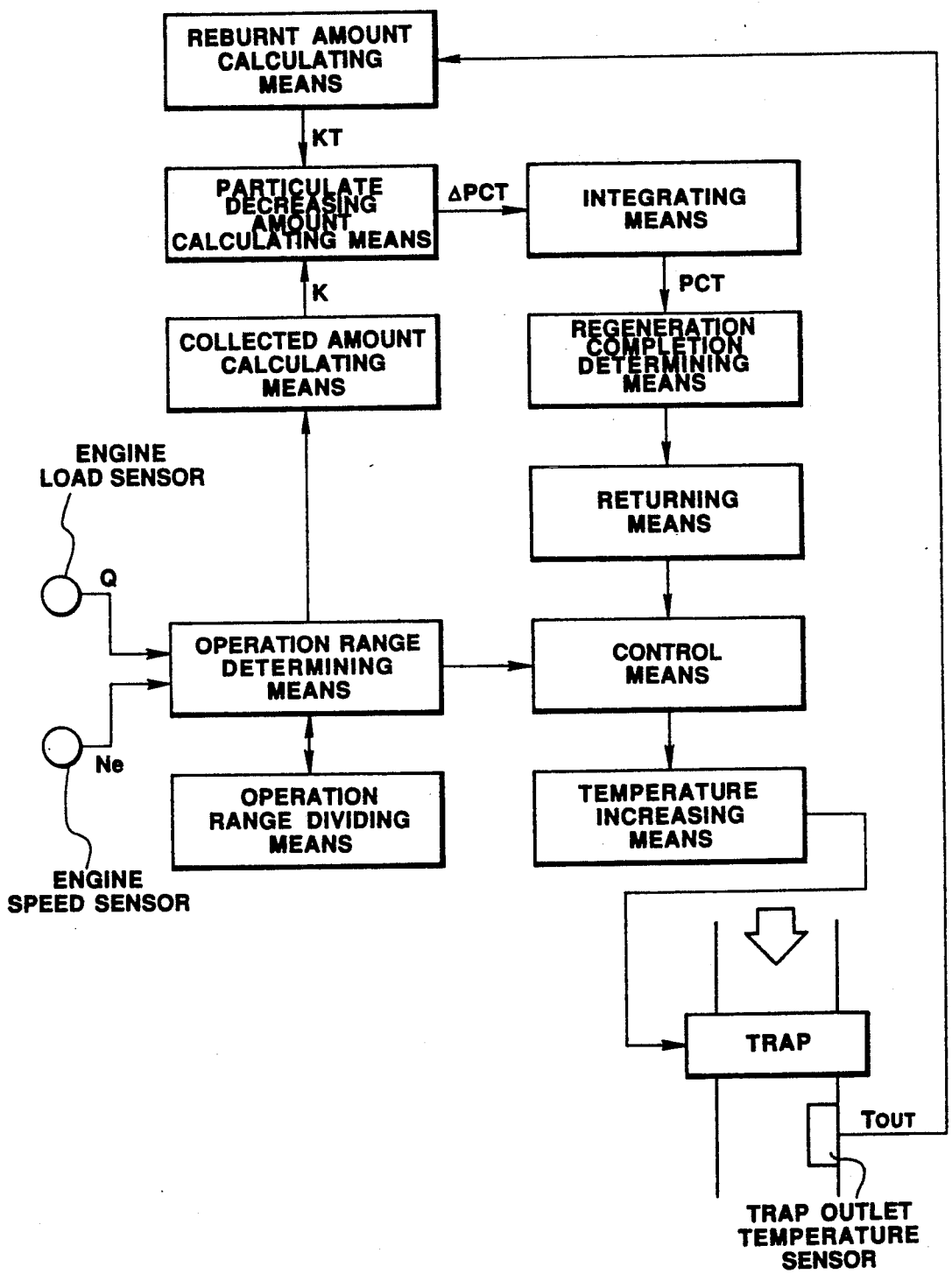
FIG. 3 is a schematic block diagram showing the conceptual arrangement of the first embodiment of the present invention.

FIG. 2 shows an engine system to which the embodiments of the present invention are applied. In this arrangement a normally open induction throttle valve 6 is disposed in the induction manifold 5 and operatively connected with a vacuum servo motor 8 in a similar manner as disclosed in connection with the prior art.

In this embodiment, the vacuum chamber of the vacuum servo motor is connected with a source of vacuum such as a vacuum pump by way of a three way solenoid valve 19. when the valve 19 is switched to its ON state a negative pressure of a predetermined magnitude is supplied into the vacuum chamber of the servo in place of atmospheric pressure.

A normally open butterfly type exhaust throttle valve 21 is disposed in the exhaust conduit or passage 2 at a location upstream of the particle trap 3. This valve is operatively connected with a vacuum servo motor 22. A three-way solenoid valve 23 is arranged to control the supply of negative pressure from the above mentioned source to the vacuum chamber of the motor.

A by-pass passage 24 is arranged to lead from upstream of the trap 3 to a location downstream thereof. A normally closed butterfly type by-pass control valve 25 is disposed in the by-pass passage 24 and operatively connected with a vacuum servo motor 26. A solenoid valve 27 is arranged to control the supply of negative pressure into the vacuum chamber of this device.

A heater 29 is disposed immediately upstream of the trap filter and is arranged to heat the trap upon being supplied with an energizing signal from a control unit 41.

In this embodiment, the heater 29 and the by-pass control valve 25 are used in combination to define a trap temperature control arrangement.

A semi-conductor type pressure sensor 31 is arranged to sense the pressure differential $\Delta P$ which develops across the trap, while thermocouple type temperature sensors 32, 33 are arranged to determined the inlet and outlet temperatures which prevail at the upstream and downstream ends of the trap and output $T_{IN}$ and $T_{OUT}$ signals respectively.

A crankangle sensor 43 is arranged to detect the rotational speed Ne of the engine 1 while an engine load sensor 35 is arranged to output a signal Q indicative of accelerator pedal depression. An engine coolant temperature sensor 36 is arranged to output a $T_W$ signal to the control unit.

The control unit 41 contains a microprocessor which responds to the outputs of the above mentioned sensors and appropriately outputs driver signals to the three-way solenoid valves 19, 23 and 27.

Before proceeding with a detailed description of the operation of the instant embodiment, it is deemed advantageous to briefly point out the various facets of control and the parameters which influence the same.

1. TEMPERATURE CONTROL

Figure 4:
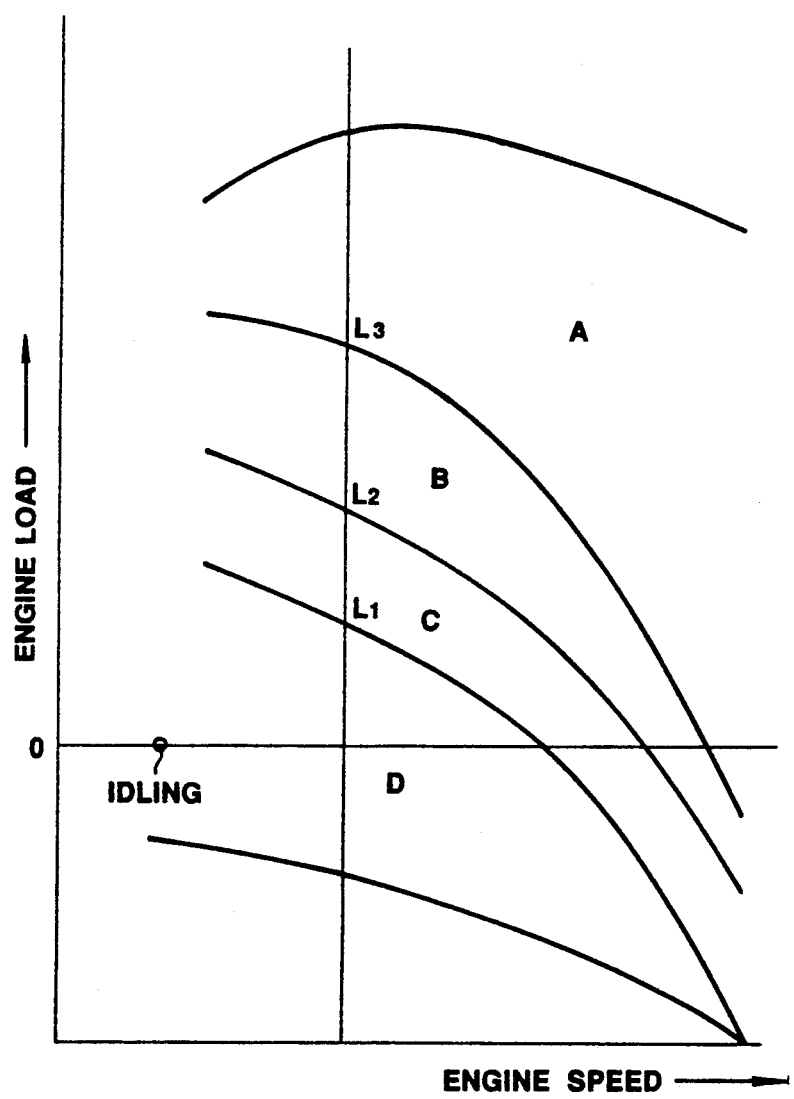
FIG. 4 is a graph which shows in terms of engine speed and engine load four zones A-D which are used in connection with the first embodiment of the invention.

The engine speed/load conditions are divided into four ranges A-D as show in FIG. 4. The above mentioned temperature control arrangement is arranged to operate in a different mode in each of these ranges.

Range A—Mode (i)

Figure 5:
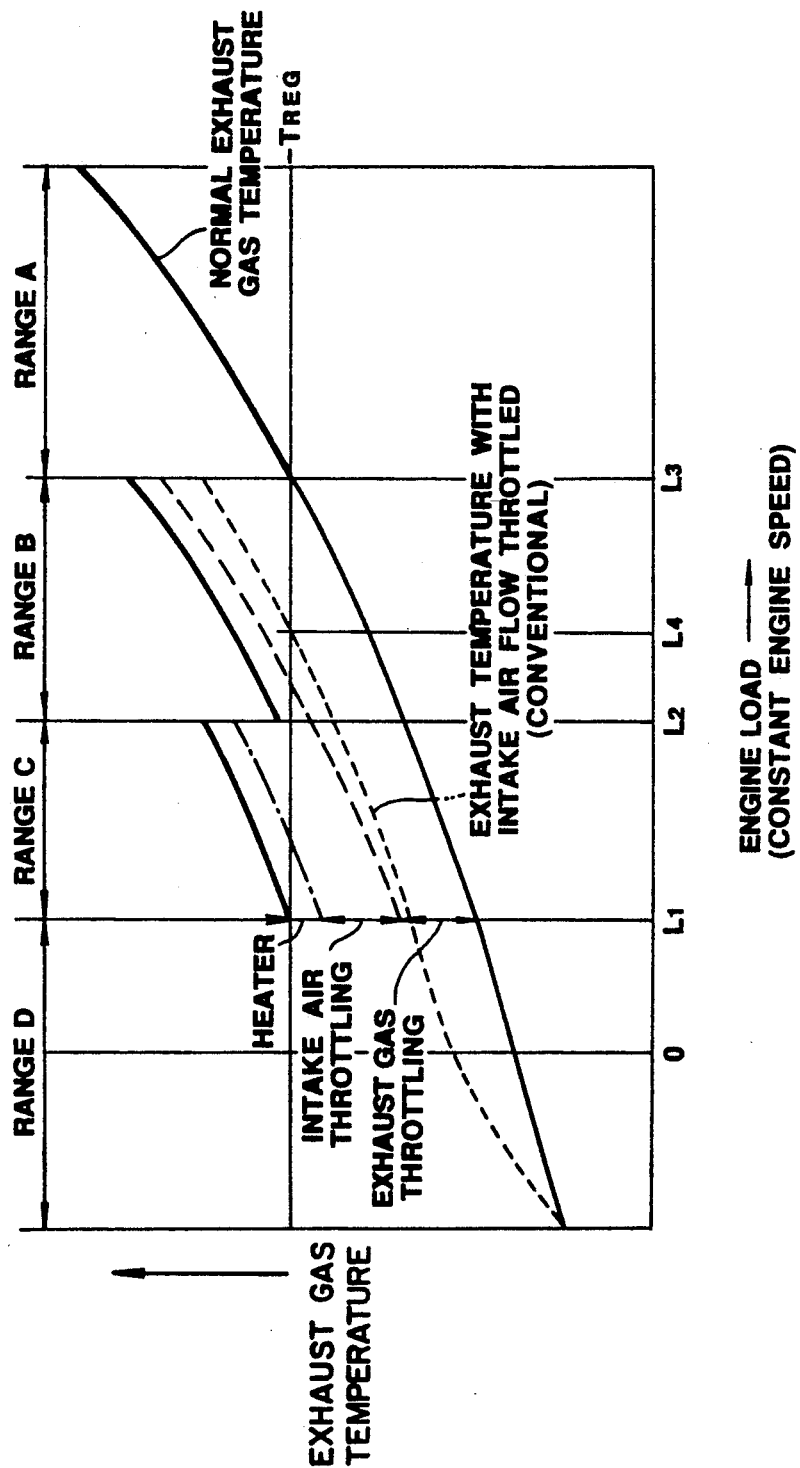
FIG. 5 is a graph showing the manner in which the exhaust gas temperature varies with engine load and the effect of the various temperature increasing techniques have thereon.

In this range, as the exhaust gas temperature is above the regeneration temperature $T_{REG}$ ($\approx 400°$ C.) as indicated in FIG. 5, trap regeneration initiates spontaneously and no control is required. It will be noted that FIG. 5 shows the exhaust gas temperature changes which occur with change in engine load at constant engine speed.

Range B—Mode (ii)

The regeneration temperature $T_{REG}$ is reached after the exhaust gases are increased somewhat. In this range, if the throttle valve is arbitrarily closed to induce the required temperature increase, as the engine is operating under a relatively high load, the amount of smoke which is produced increases abruptly as the excess air ratio is relatively small under such conditions. Accordingly, it is preferred to energize the heater 29 while throttling only the exhaust flow.

Range C—Mode (iii)

In this range the regeneration temperature is not reached until the exhaust gas temperature has been raised by a considerable amount as will be appreciated from FIG. 5. However, as the excess air ratio is relatively large the amount smoke and particulate matter does not increase in response to induction throttling. Accordingly, in this range both the exhaust and the induction are throttled while energizing the heater.

Range D—Mode (iv)

In this range the regeneration temperature $T_{REG}$ cannot be obtained even if the induction and exhaust systems are throttle and the heater is energized. However, it is possible to use the high exhaust temperatures which occur during transient modes of operation, for example, during a change from high speed/high load into range D. For this reason D range is considered as being divided into three sub-sections:

$D1(T_{IN} \geq T_1)$,
$D2(T_{IN} < T_1)$ and
$D3(T_{IN} < T_1$ and $T_{OUT} < T_2)$.

NB  $T_1 = 400°$ C.
    $T_2 = 300°$ C.

Where possible the high exhaust gas temperatures are actively used in the corresponding sub-modes (iv-1) to (iv-3).

(iv-1) Range D1:

Although regeneration can be spontaneously initiated in this range it is preferred to additionally energize the heater 29.

(iv-2) Range D2

In this range the temperature $T_{OUT}$ at the downstream side of the trap 3 is lower than the temperature $T_{IN}$ at the upstream end indicating that the trap is being cooled by the exhaust gases. Accordingly, in order to maintain the temperature of the trap 3 as high as possible, the heater is energized and the by-pass control valve 25 is opened. This directs the relatively cool exhaust gases around the trap while simultaneously heating the interior of the same.

(iv-3) Range D3

In this very low exhaust gas temperature range the regeneration temperature cannot be reached under any circumstances. If either of the engine induction or exhaust is throttled, the engine will misfire particularly at low engine coolant temperatures, resulting in the increase in particulate emission and degradation of engine output. Further, when the engine is cold (low coolant temperature) the trap will be cooled by the passage of the very low temperature exhaust gases therethrough and it is accordingly preferred to open all of the throttle valves 6, 21 and 25 while leaving the heater off.

1. DETECTION OF REGENERATION COMPLETION

In ranges A, B, C and D1 all of the particulate matter which is collected in the trap 3 is regenerated in response to the increase in exhaust gas temperature, while the particulate matter which is contained in the exhaust gases is collected.

Assuming that KT is the amount of particulate matter reburnt per unit time $\Delta t$ and K is the amount of particulate which is collected in that time, the amount of reduction in the particulate in the trap per unit time can be expressed as:

$$\Delta PCT = KT - K \tag{1}$$

In this case the value of KT is dependent on the exhaust gas temperature prevailing at the downstream side of the trap-viz., $T_{OUT}$. Accordingly, KT is derived using the sensed value of $T_{OUT}$.

On the other hand, the value of K is dependent on the operating range-viz., the amount of particulate matter contained in the exhaust gases is dependent on a number of engine operational parameters.

Assuming the that the total amount of particulate discharged from the engine in the unit time $\Delta t$ is represented by IN and the efficiency of the trap is given by $\eta$ then the product of $IN \times \eta (=K)$ will be indicative of the amount of particulate collected per unit time ($\Delta t$).

Thus for each zone of operation is necessary to derive the value of K independently, (viz., derive KA−KD)

Accordingly, equation (1) may be rewritten for each zone as follows:

$$\text{RANGE A: } \Delta PCT = KT - KA \tag{2}$$

$$\text{RANGE B: } \Delta PCT = KT - KB \tag{3}$$

$$\text{RANGE C: } \Delta PCT = KT - KC \tag{4}$$

$$\text{RANGE D1: } \Delta PCT = KT - KD \tag{5}$$

The $\Delta PCT$ value is integrated each time interval $\Delta t$. When the value of PCT (particulate decreasing amount) reaches a predetermined reference value all of the particulate matter is deemed to have been burnt and the regeneration completed. In this instance the reference value varies with the capacity of the trap.

It will be noted that the value of PCT for each of the ranges A-D1 may be expressed as:

$$\text{RANGE A: } PCT = PCT + KT - KA \tag{6}$$

$$\text{RANGE B: } PCT = PCT + KT - KB \tag{7}$$

$$\text{RANGE C: } PCT = PCT + KT - KC \tag{8}$$

$$\text{RANGE D1: } PCT = PCT + KT - KD \tag{9}$$

Range D2

In this range almost no particulate will be collected as the exhaust gases are directed through the by-pass passage 24. Accordingly, the value of $\Delta PCT$ per unit time $\Delta t$ is derived without the use of K:

$$\Delta PCT = KT \tag{10}$$

$$PCT = PCT + KT \tag{11}$$

Range D3

The value of $\Delta PCT$ is not derived in this range as no particulate matter is burnt and essentially none collected as the exhaust gases are bypassed around the trap.

Figure 8A:
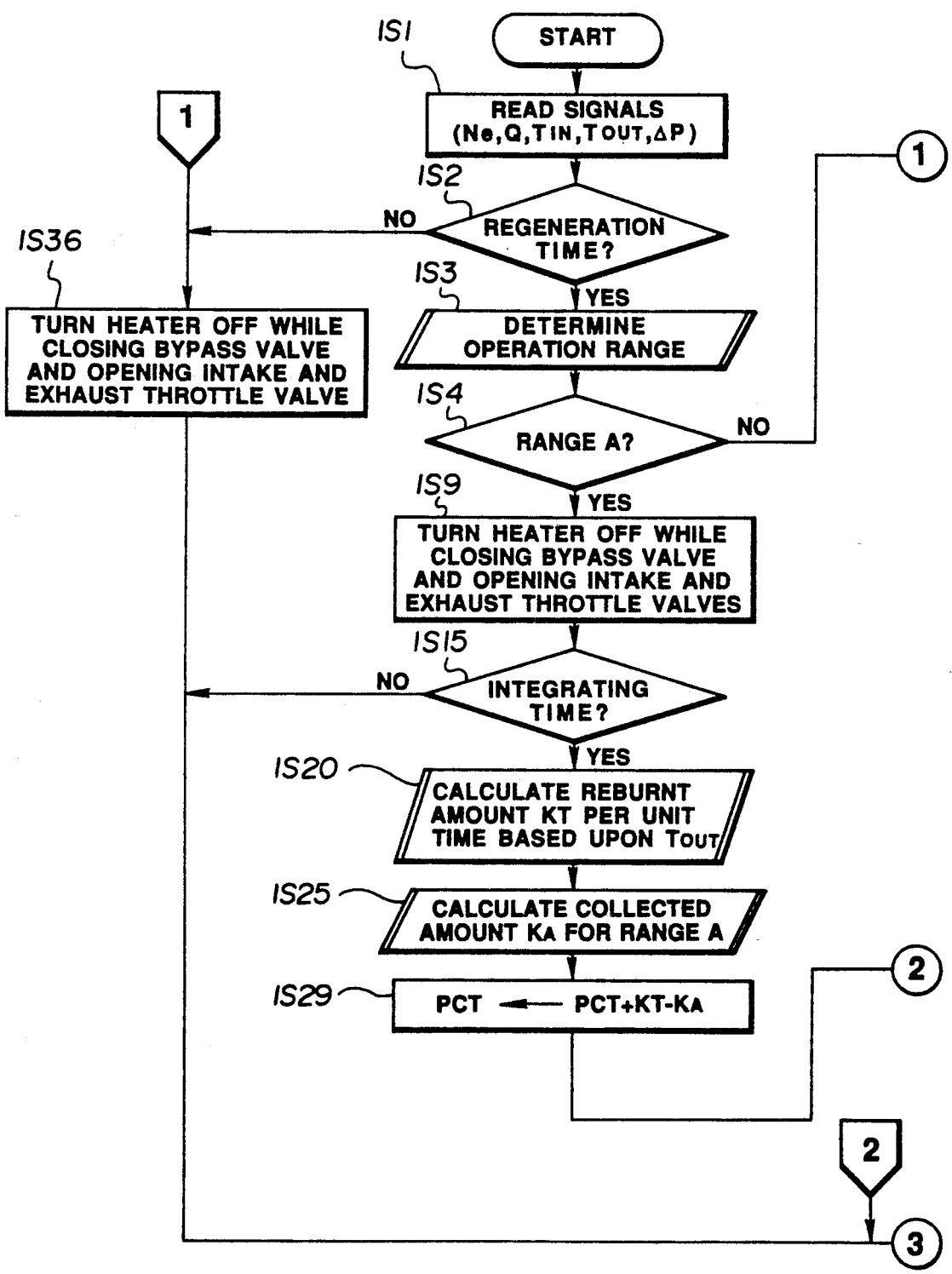
FIGS. 8A-8C show in flow chart form the operations which are performed when implementing the control of the first embodiment.
Figure 8B:
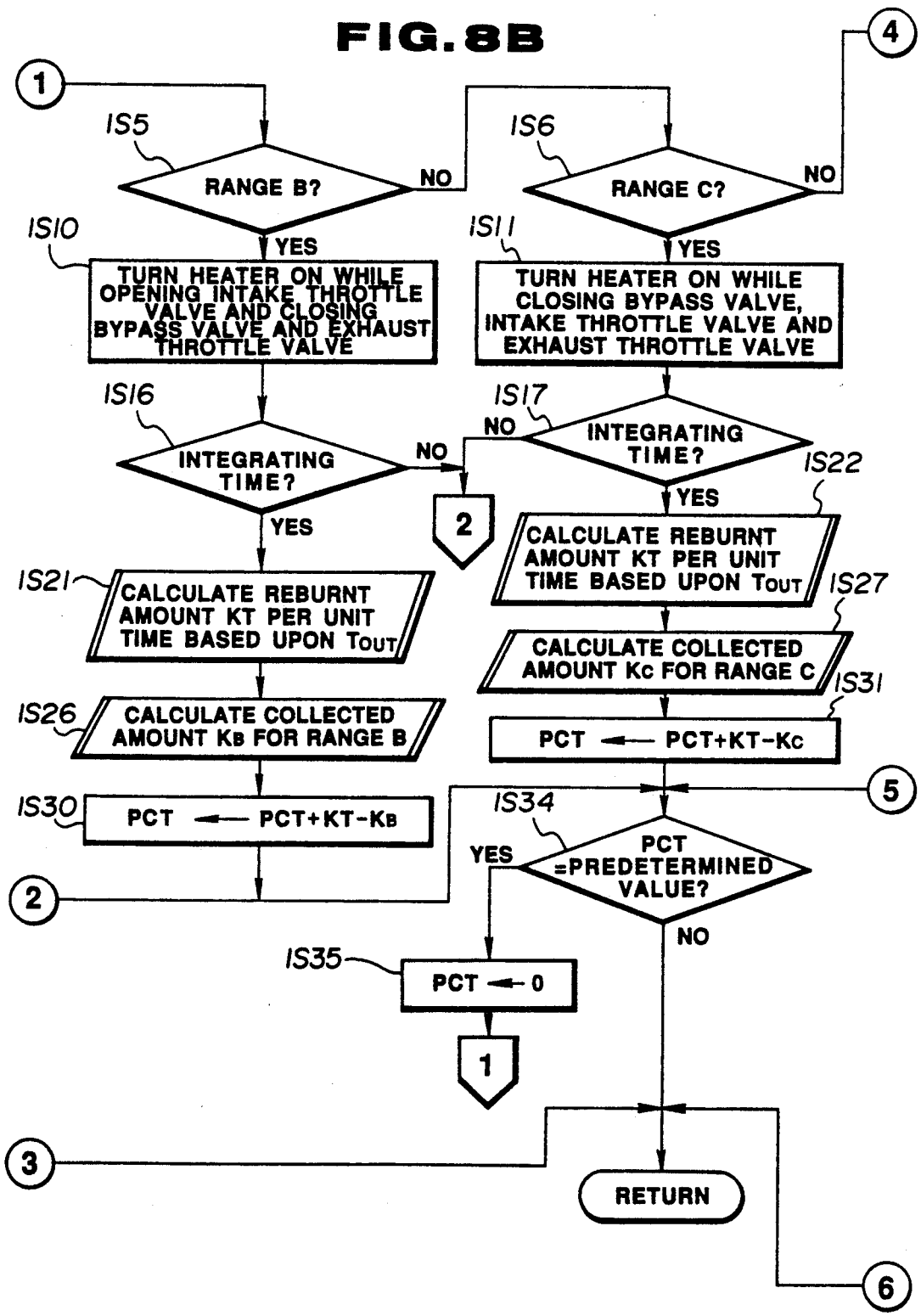
Figure 8C:
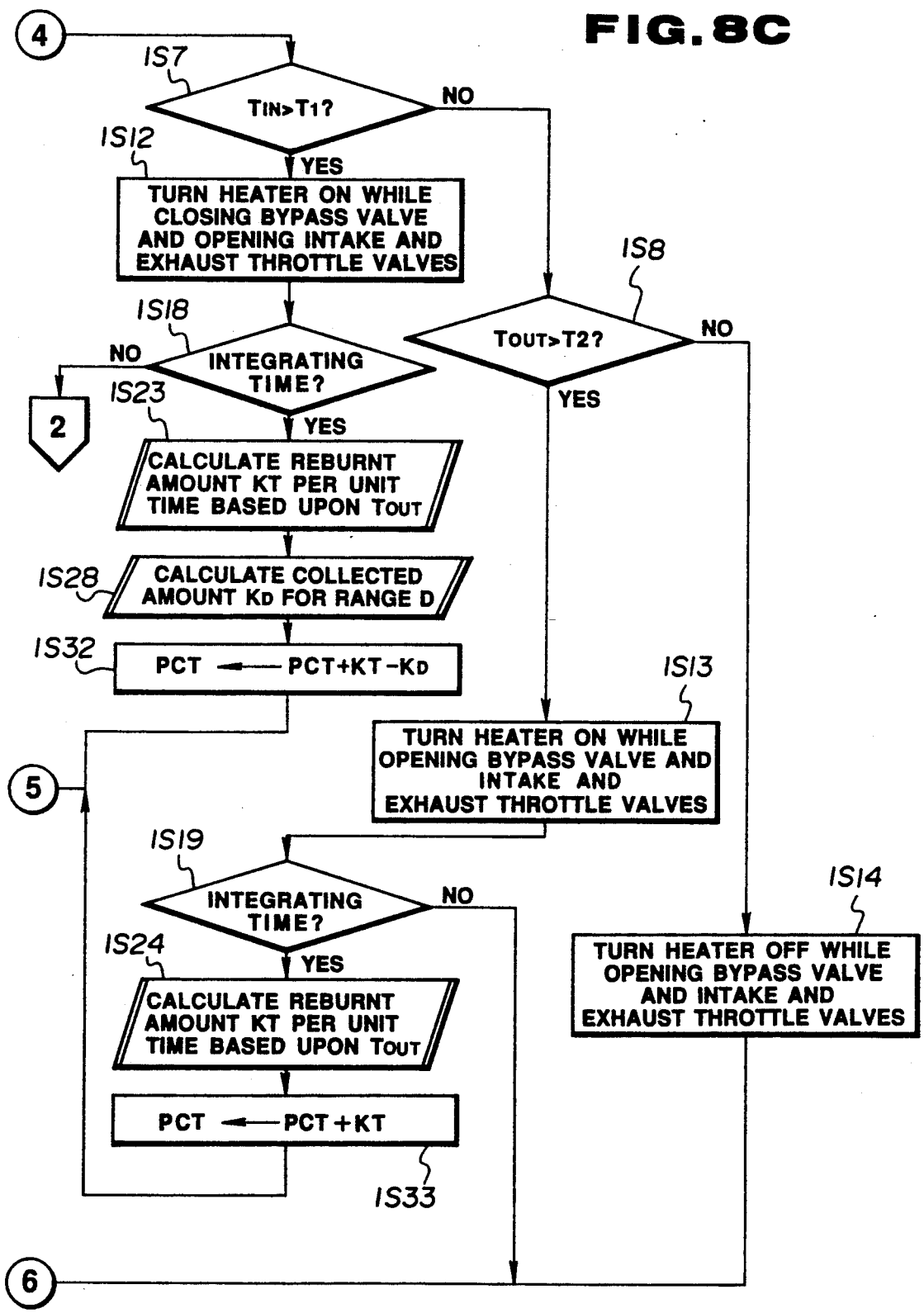

FIGS. 8A-8C show a flow chart which depicts the operations performed by a program stored in the ROM of the microprocessor included in the control unit 41. This program is such as to execute the above described modes of operation.

At step 1S1 the engine speed Ne, engine load Q, coolant temperature $T_w$, in inlet and outlet temperatures $T_{IN}$, $T_{OUT}$ of the trap 3, and the pressure differential which exists between the inlet and outlet of the trap $\Delta P$, are read into memory.

At step 1S2 it is determined if it is time for a trap regeneration or not. In this embodiment, this determination is made by comparing the instant $\Delta P$ value with a $\Delta$max value obtained from tabled data which is recorded in terms of engine speed and engine load. If $\Delta P \geq \Delta Pmax$ then it is determined that a predetermined amount of particulate matter has accumulated in the trap and it is now necessary to reburn the same.

It will be understood that the present invention is not limited to this particular method and other conventional techniques can also be used. Once a determination that regeneration is required is made, a flag can be set which will induced the routine to flow to step 1S3 until such time as it is cleared by the routine being induced to pass through step 1S36 wherein the system is initialized in a manner to induce the pre-regeneration throttle valve and heater settings to be resumed. Viz., once a regeneration is initiated it should be maintained until such time as the particulate content is indicated has having been satisfactorily re-burnt.

In the case regeneration is indicated as being necessary, the routine flows to step 1S3. It will be noted that at steps 1S3–1S6, 1S7 and 1S8 the instant engine speed and engine load values are used to determine which of the ranges A-D the engine is currently operating in. More specifically, in steps 1S3-1S6 tabled data of the nature depicted in FIG. 4 is stored in ROM and used to enable the zone determination to be carried out.

If it is determined that the engine is operating in zone A then the routine proceeds to step 1S9, while in the case of a zone B determination the routine goes to step 1S10. In event of zone C detection the routine goes to step 1S11 while if it is determined that the engine is not operating in any of the zones A–C then it is assumed that the operation is taking place in the D zone and the routine goes to step 1S7.

At steps 1S7 and 1S8 it is determined which of the temperature ranges D1 to D3 the value of $T_{IN}$ and $T_{OUT}$ fall in. If the temperature data is such as to fall in range D1 then the routine flow to step 1S12, while it goes to step 1S13 in the case of D2 and step 1S14 in the case of range D3.

In steps 1S9–1S14 exhaust gas temperature control is implemented.

By way of example, in the event that zone A operation is detected and the routine flows to step 1S9, as the exhaust gas temperature is above $T_{REG}$, the heater 29 is conditioned to assume a de-energized state (OFF) while exhaust gases are prevented from passing through the by-pass passage 24 by closing the by-pass control valve 25 and the induction and exhaust throttle valves 6, 21 are opened.

On the other hand, if the routine flows to step 1S14 in response to the detection of a D3 mode of operation, the same control as implemented in step 1S4 is applied. The reason for this control is that, as mentioned previously, if either of the engine induction or exhaust is throttled, the engine will misfire particularly at low engine coolant temperatures, resulting in the increase in particulate emission and degradation of engine output. Further, when the engine is cold (low coolant temperature) the trap will be cooled by the passage of the very low temperature exhaust gases therethrough.

Figure 6:
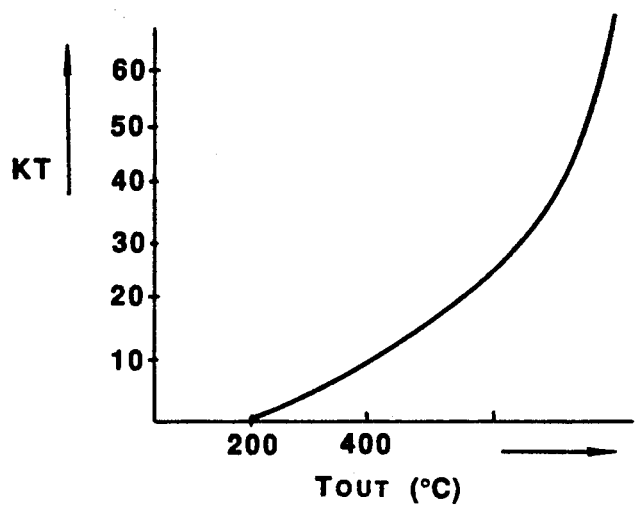
FIG. 6 graphically depicts tabled data used in determining the amount of particulate matter combusted per unit time for a given exhaust gas temperature at the outlet of the trap.

At steps 1S15 to 1S19 the integration time is checked. If a value indicative of a predetermined time period (e.g. 2 seconds) has been reached then the routines flow to steps 1S20 to 1S24, respectively. In these steps the amount of particulate matter 24 reburnt per unit time $\Delta t$ is derived by using the trap outlet temperature $T_{OUT}$ and tabled data of the nature depicted in FIG. 6. It will be noted that as KT is dependent on exhaust gas temperature alone, the same data can be used for all modes (A–D) of operation.

Figure 7:
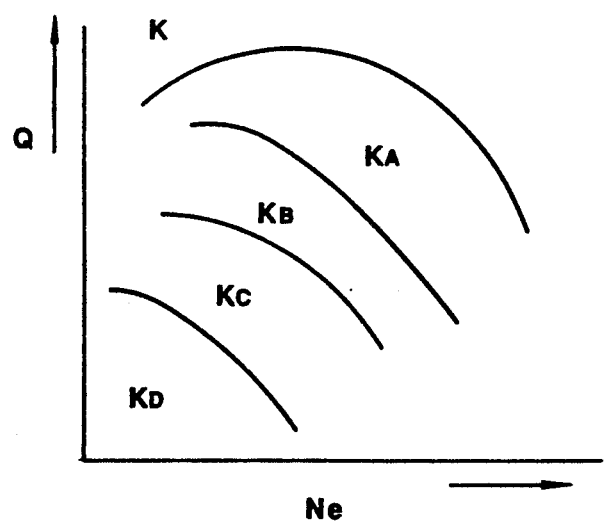
FIG. 7 graphically depicts tabled data which is used to determine the amount of particulate matter collected per unit time.

At steps 1S25 to 1S28 the particulate collection KA–KD per unit time $\Delta t$ for each of the ranges is determined using tabled data of the nature depicted in FIG. 7.

At steps 1S29 to 1S33 the $\Delta$PCT rates are calculated using equations (2)–(5) and (10) and then integrated using equations (6)–(9) and (11) to obtain corresponding PCT values.

At step 1S34 it is determined if the value of PCT exceeds a predetermined reference value or not (e.g. 10 gm). If the outcome is affirmative, then the routine goes to step 1S35 wherein the PCT memory is reset. It will be noted that in steps 1S29–1S33 that the same value of PCT is used through and updated. Viz., each time the routine passes through one of these steps the previously recorded value of PCT is read out of memory modified and re-recorded.

At step 1S36 the settings of the induction throttle valve 6, the exhaust throttle valve 21, the by-pass control valve 24 and the heater 29 are returned to their initial states.

As will be appreciated, from the above description, as the rate at which the collected particulate matter is burnt and the rate at which it is accumulated, are calculated during each regeneration by taking the exhaust gas temperature and engine operational modes into consideration, and the overall rate at which the particulate matter is decreasing is integrated, all modes of operation, including transient ones.

This enables the regeneration to be terminated as soon as an indication that the particulate matter has been satisfactorily reduced has been generated (viz., the routine being induced to pass through steps 1S35 and 1S36.

Accordingly, prolonged throttle valve closure is obviated. This enables the undesired effects on the engine performance and economy to be minimized. Further, as the regeneration is maintained until such time as the satisfactory reduction of the particulate matter is indicated, the chances of an excessive accumulation and overly intense combustion can be eliminated thus ensuring that the trap will not be subject to thermal damage.

In this first embodiment it should be noted that the trap heating technique is not necessarily limited to the throttle closure and heater application methods and other modes of temperature elevation may be employed if deemed preferable.

SECOND EMBODIMENT

Figure 9:
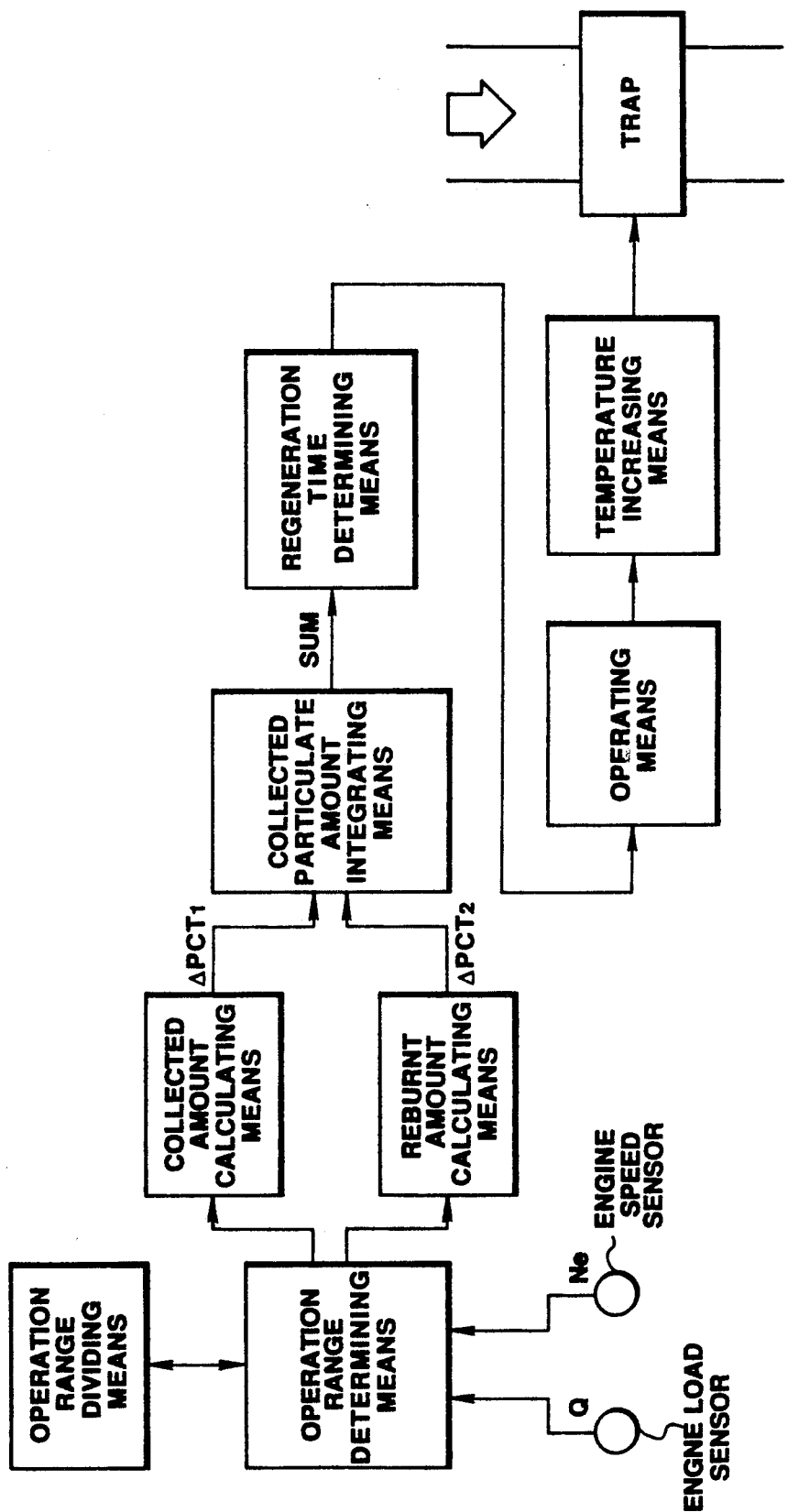
FIG. 9 is a block diagram showing the conceptual arrangement of a second embodiment of the present invention.

FIG. 9 shows the conceptual arrangement of the second embodiment. This embodiment features the arrangement wherein a collected particulate amount per unit time $\Delta PCT_1$ or a reburnt particulate amount per unit time $\Delta PCT_2$. As both of $\Delta PCT_1$ and $\Delta PCT_2$ are dependent on engine operating conditions and parameters, they vary with the same. The accumulated particulate amount SUM which is derived by adding $\Delta PCT_1$ and subtracting $\Delta PCT_2$ therefore follows changes in the engine operating conditions.

Hence, in this embodiment also it is possible to accurately determine the amount of particulate matter which has accumulated and therefore determine when regeneration is required.

The second embodiment makes use of the same hardware as used in the first with the exception that the output of the sensor which detects the exhaust gas temperature at downstream side of the trap 3 ($T_{OUT}$), is not utilized.

Figure 10A:
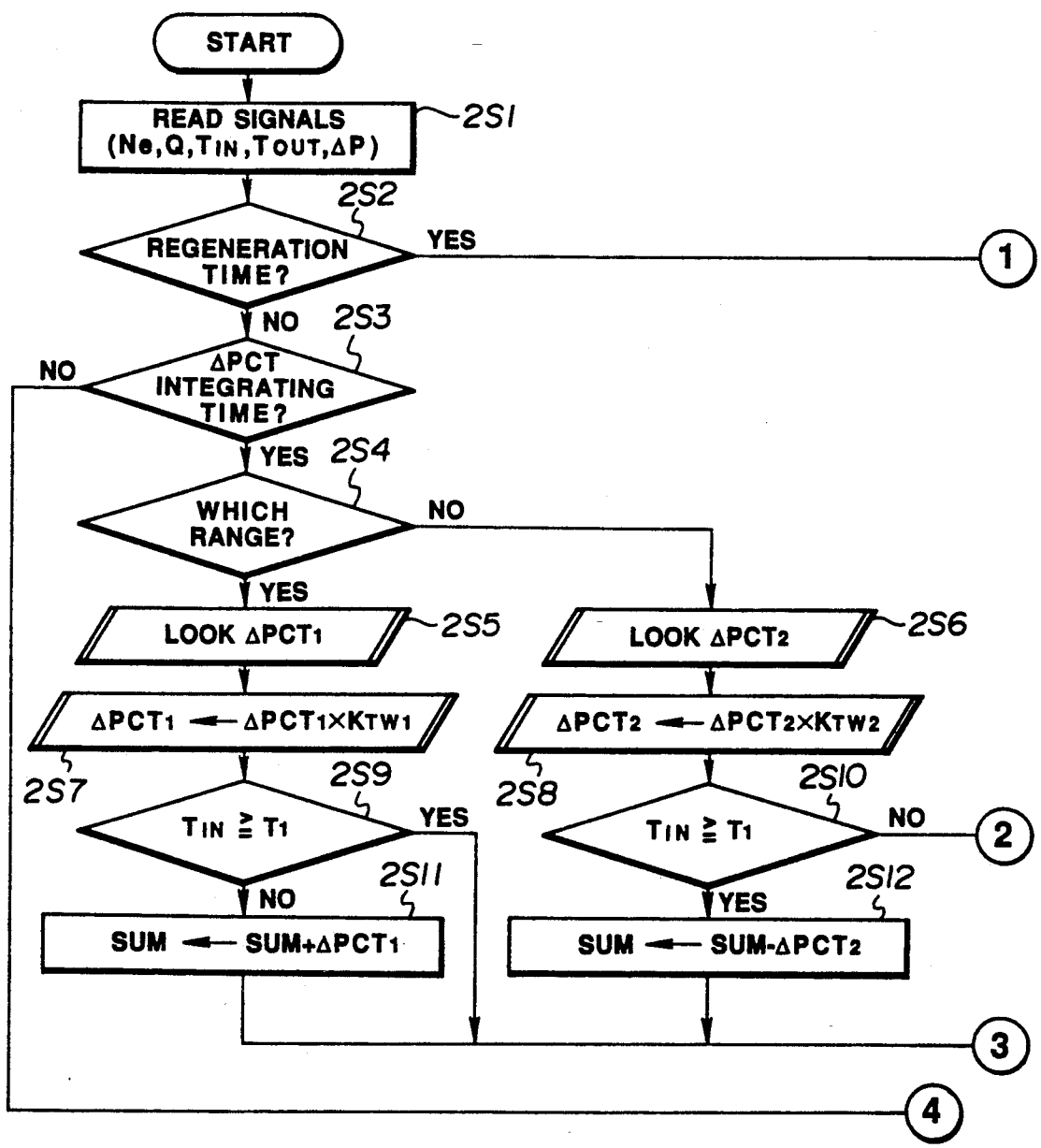
FIGS. 10A-10B show in flow chart form the operations which are performed when implementing the control of the second embodiment.
Figure 10B:
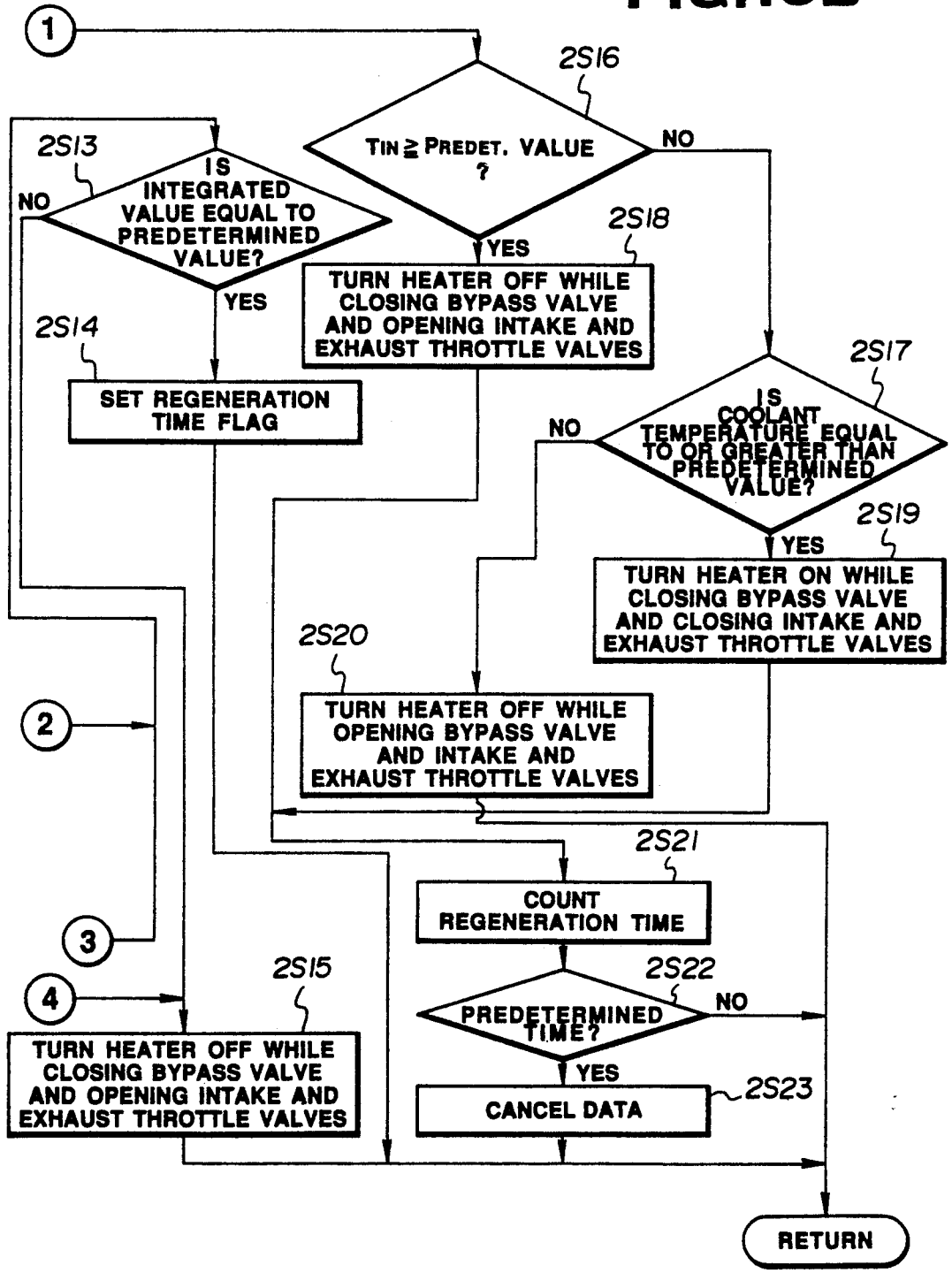

FIGS. 10A and 10B depict in flow chart form the operations which are performed a control program according to the second embodiment. At step 2S1 the outputs of the sensors are sampled and the instant values of Ne, Q $T_W$ and $T_{IN}$ are read in.

In this flow chart steps 2S1, 2S13 and 2S14 are such as to control the timing with which regeneration is initiated. In step 2S2 the status of a regeneration required flag F is checked. In the event that it is not time to regenerate the trap 3 then flag F will have been found to have been cleared (F=0). In the event that F=0 then the routine goes to step 2S3. At this step it is determined if it is time to perform an integrate a $\Delta$PCT value. In the case the time for integration has arrived, the routine goes to step 2S4. It will be noted that the interval $\Delta t$ between integrations can be set at 2-3 second intervals for example.

Figure 11:
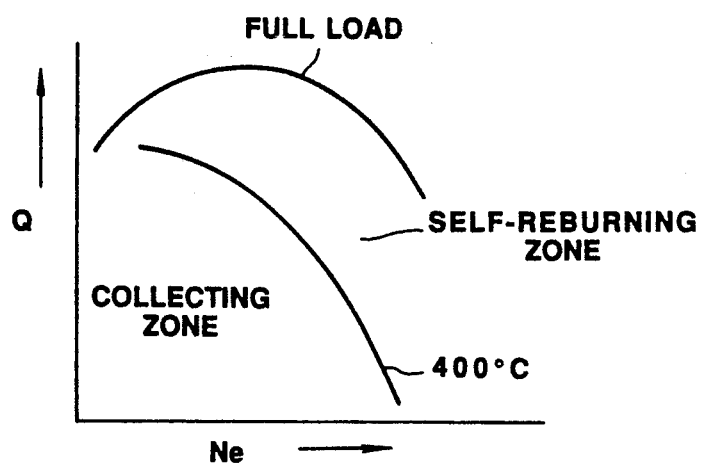
FIGS. 11-15 depict tabled data which is used in connection with the second embodiment.

At step 2S4 it is determined which ranged the engine is operating in. In this embodiment mapped data of the nature depicted in FIG. 11 is used. As will be appreciated from this figure, engine operation is divided into two engine speed (Ne)/load Q ranges. The first is a range wherein re-burning of the accumulated combustible particulate is spontaneous and the other a range wherein particulate matter accumulates in the trap 3.

Basically step 2S4 is one of determining if the instant engine speed and load values indicate that the exhaust gases are hot enough (400° C. or above) to initiate a regeneration or not. While the engine is operating in "collecting" zone then the total amount of particulate should be increased by adding $\Delta PCT_1$. On the other hand, if the engine is operating in the "self-reburning" zone then the total particulate should be reduced by substracting the $\Delta PCT_2$ value therefrom.

In the event that the outcome of step 2S4 indicates that particulate collection can be expected then the routine proceeds to step 2S5 while it goes to step 2S6 in the event that reburning is indicated.

Figure 12:
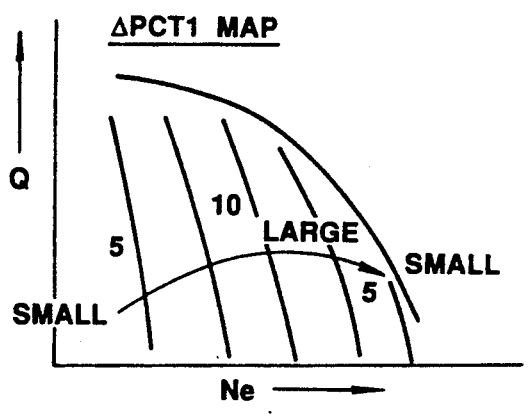
Figure 13:
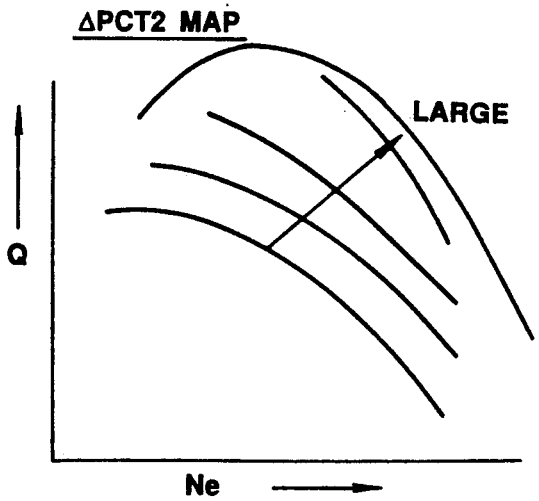

In steps 2S5 and 2S6 the amount of particulate collected per unit time $\Delta PCT_1$ and the amount of particulate matter burnt per unit time $\Delta PCT_2$ are derived by look-up using tabled data of the nature illustrated in FIGS. 12 and 13. As will be appreciated from FIG. 5 the collection tends to peak at or about the central engine speed/load region.

Figure 14:
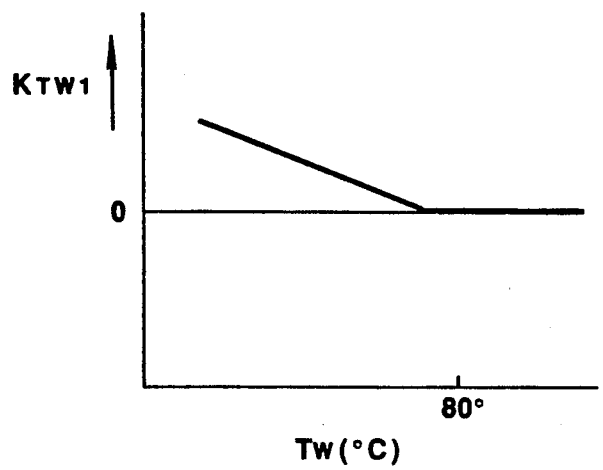
Figure 15:
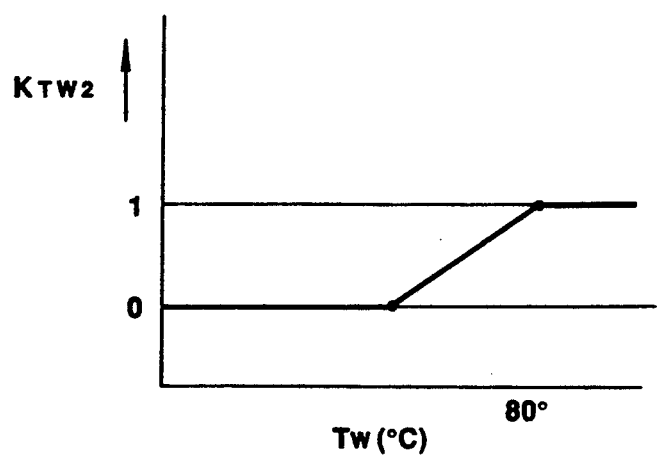

At steps 2S7 and 2S8 mapped data of the nature illustrated in FIGS. 14 and 15 are used to derive coolant temperature related correction factors $K_{TW1}$ and $K_{TW2}$ which are used to correct the values of $\Delta PCT_1$ and $\Delta PCT_2$ as indicated in equations (12) and (13)

$$\Delta PCT_1 \leftarrow \Delta PCT_1 \times K_{TW1} \quad (12)$$

$$\Delta PCT_2 \leftarrow \Delta PCT_2 \times K_{TW2} \quad (12).$$

As will be appreciated from FIG. 14 at low coolant temperatures, the value of $PCT_1$ will be increased by the application of a relatively large correction factor. The reason for this is that under such conditions the amount of particulate discharged from the engine is greater than in the case the engine is fully warmed-up. For similar reasons the value of $\Delta PCT$ decreases as the engine coolant temperature rises. Viz., as the coolant temperature rises—indicating engine warm-up, the amount of particulate matter emitted by the engine will tend to reduce.

At step 2S9 the instant value of $T_{IN}$ is compared with a predetermined reference temperature $T_1$ ($T_1 = 400°$ C. $= T_{REG}$).

In the event that $T_{IN} < T_1$ then the routine goes to step 2S11 while if the outcome of step 2S4 was such as to direct the routine to step 2S6, and $T_{IN} \geq T_1$ then the routine flow from step 2S10 to 2S12. Steps 2S11 and 2S12 the values of $\Delta PCT_1$ and $\Delta PCT_2$ are integrated. Viz.:

$$SUM \leftarrow SUM + \Delta PCT_1 \quad (14)$$

$$SUM \leftarrow SUM - \Delta PCT_2 \quad (15).$$

In the event that it is found that $T_{IN} \geq T_1$ in step 2S9 then the routine by-passes step 2S11. The reason for this is that even though the engine operation falls in the collection zone, as $T_{IN} \geq T_1$ the engine is indicated as just having undergone a change from high speed/high load operation (viz., undergone a transient mode of operation) the trap 3 can be still expected to contain sufficient heat to induce the combustion of the particulate matter which enters the same at such time. Accordingly, the amount of particulate accumulated per unit time should not be added under such circumstances.

Similarly, in the case wherein it is found that $T_{IN} < T_1$ in step 2S10, it can be expected that the engine has just changed from a low speed/low load mode of operation and that at this time that insufficient heat is available to induce combustion and the routine by-passes step 2S12.

At step 2S13 the SUM value is compared with a predetermined reference value (e.g. 10 gm). If SUM $\geq$ the reference value, it is indicated that enough particulate matter has been accumulated to warrant a regeneration and the routine goes to step 2S14 wherein the above mentioned regeneration required flag F is set (F=1).

A will be appreciated, the setting of the flag F causes the routine to flow from step 2S2 to steps 2S16–2S20 wherein appropriate commands which control the opening and closing of the throttle valves are generated. More specifically, at step 2S16 the instant $T_{IN}$ value is compared with $T_1$. In the event that $T_{IN} \geq T_1$ then the trap can be spontaneously re-generated and the routine flows to step 2S18.

However, if $T_{IN} < T_1$ then the routine flows to step 2S17 wherein the coolant temperature $T_W$ is compared with a predetermined level (e.g. 50° C.). In the event that $T_W$ is above the given level, then the routine flows to step 2S19. In this step commands which energize the heater 29 and induce the throttling of both the induction and exhaust systems, are issued. As disclosed above, this boosts the exhaust gas temperature to a level whereat combustion of the accumulated particulate matter is induced.

On the other hand, if the coolant temperature is below the given set level then the routine flows from step 2S17 to step 2S20 wherein commands which open all of the throttle valves 6, 21 and 25, are issued. As explained earlier in the specification, this measure is exacted as there is no possible way the temperature of the exhaust gases can be adequately boosted to the $T_{REG}$ level.

At step 2S21 the regeneration time is clocked and compared with a predetermined time value in step 2S22. This time can be set in the order of 10 seconds or the like. Upon the regeneration being determined has having proceeded for the given time period the routine proceeds to step 2S23 wherein the data used in the just competed regeneration process is deleted and the regeneration required flag F rest (F=0).

In summary the above process is such as monitor a given number of parameters and predict the accumulation of sufficient particulate matter to warrant a regeneration. The regeneration in this instance is maintained for a time predetermined to adequately combust the matter collected in the trap 3.

THIRD EMBODIMENT

FIG. 16 shows the conceptual arrangement of the third embodiment. This embodiment features the arrangement wherein the pressure differential $\Delta P$ which occurs across the trap is monitored and the pressure differential which is sensed immediately after a regeneration is compared with a $\Delta Pmax$ value to develop a ratio. This ratio increases with the amount of incombustible particulate matter which accumulates in the trap. In accordance with the amount of incombustible residue ZAN which is indicated as having accumulated, the timing with which the next regeneration is initiated is advanced.

Figure 17A:
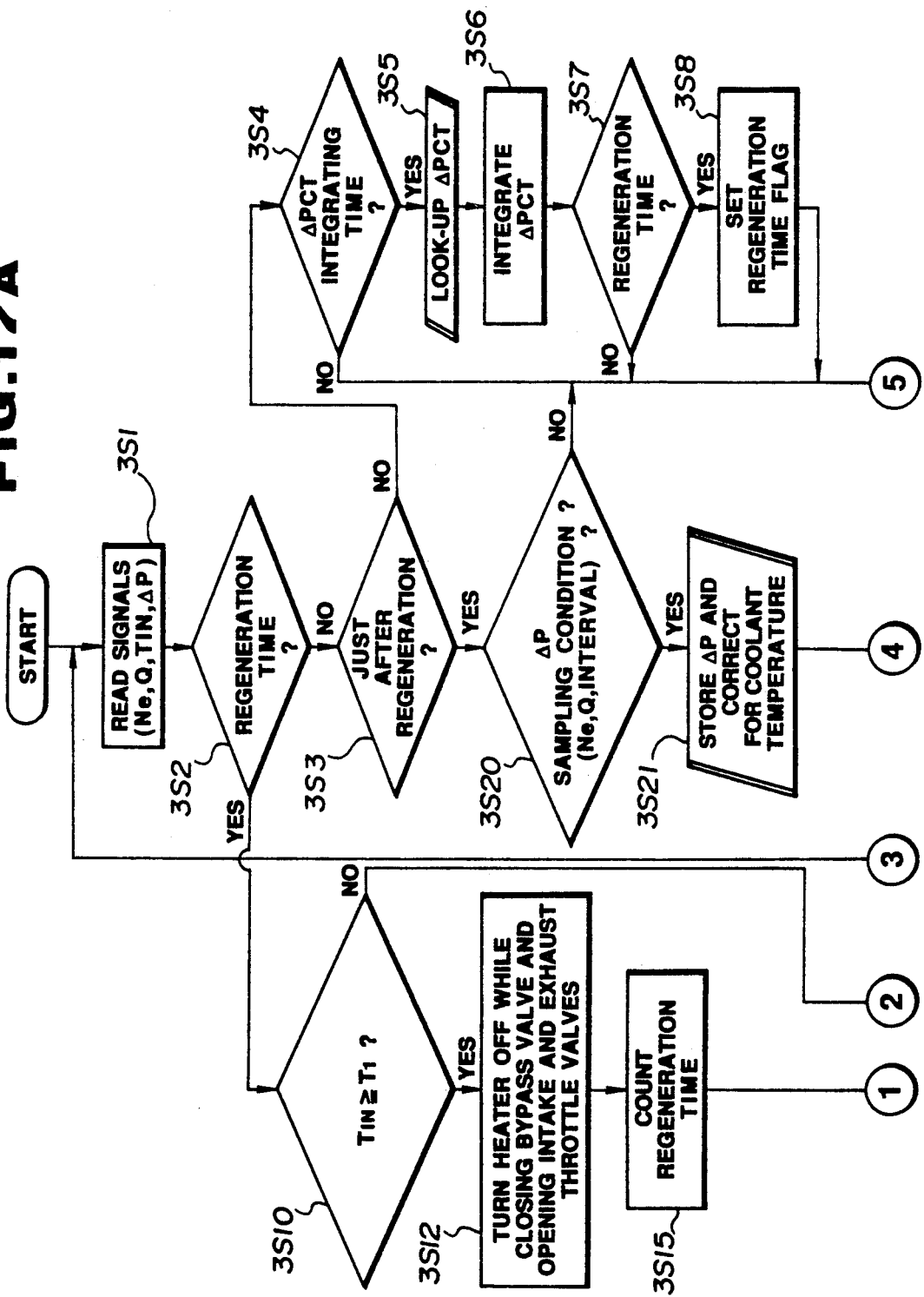
FIGS. 17A and 17B show in flow chart form the operations which are performed when implementing the control of the third embodiment.
Figure 17B:
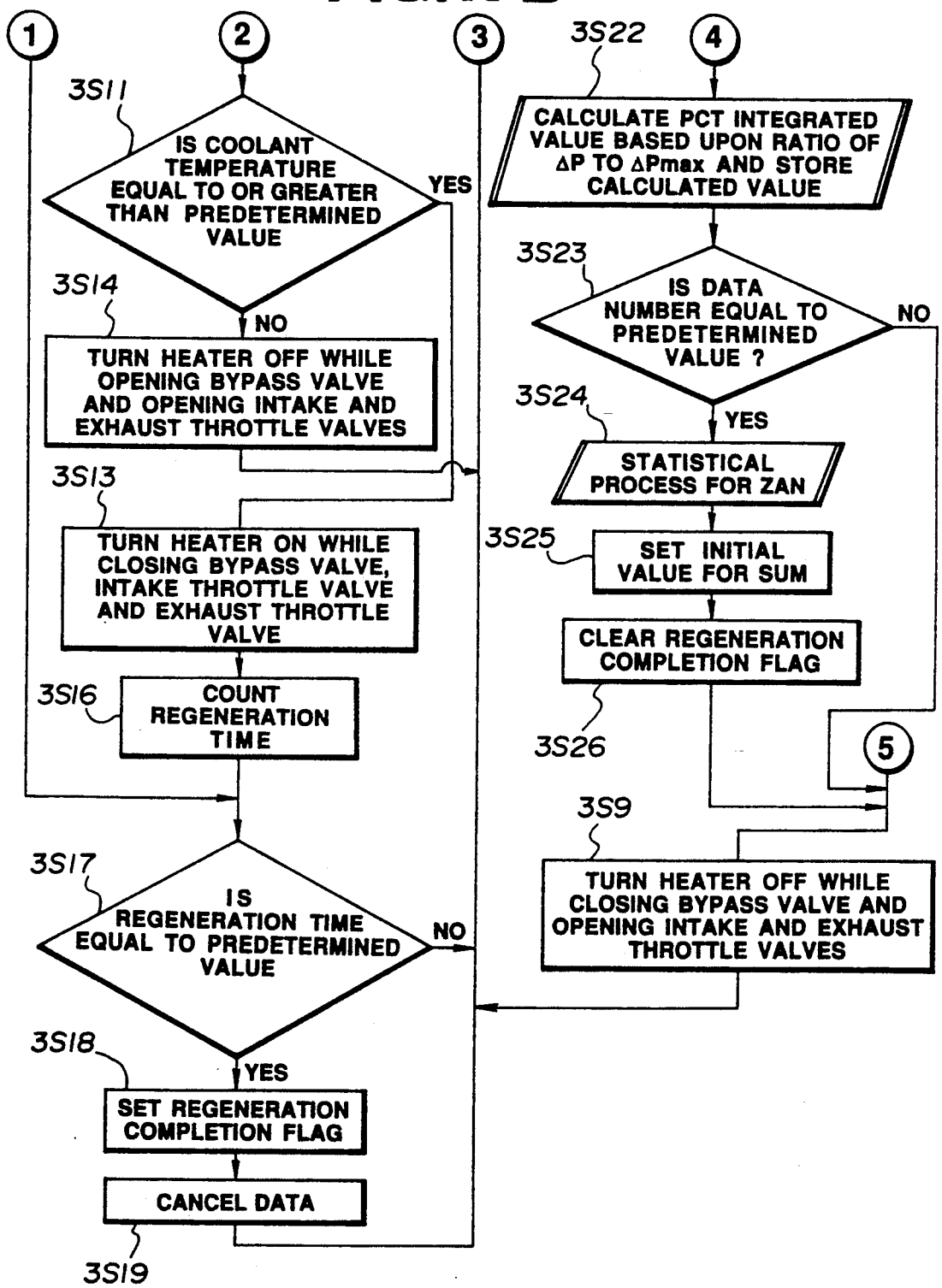

FIGS. 17A–17B show in flow chart form the operations which characterize the control provided by the third embodiment. As in the case of the first two embodiments, the first step of this routine is such as to read in Ne, Q, $T_W$, $T_{IN}$ and $\Delta P$. At step 3S2 it is determined if it necessary to initiate a regeneration or not. It this case the determination is made by checking to see of a regeneration required flag F1 has been set or not. When regeneration is not required F1=0.

At step 3S3 it is determined if a regeneration has just been completed or not. This determination is based on the status of a second regeneration completion flag F2.

Figure 18:
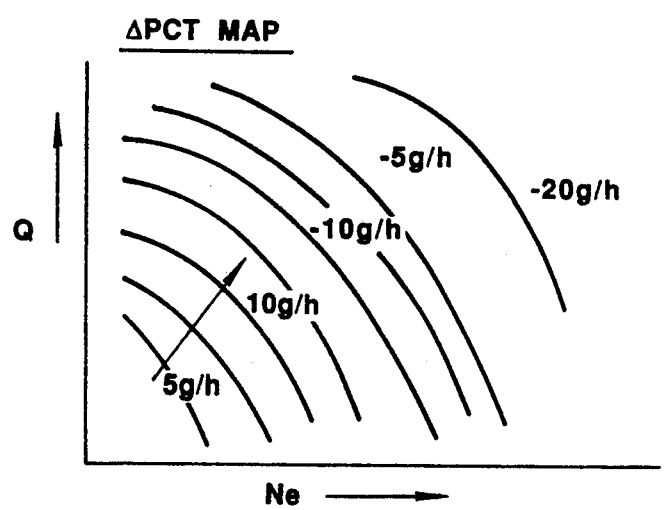
FIGS. 18-21 depict tabled data which is used in connection with the third embodiment.

This flag is set (F2=0) when a regeneration is completed. If the outcome of this enquiry indicates that a regeneration has not just been completed, the routine flows to step 3S4 wherein it is determined if it is time to integrate the collected particulate amount or not. In the case of an affirmative outcome, the routine flows to step 3S5 wherein a value of ΔPCT is looked-up using tabled data of the nature shown in FIG. 18 and the instant engine speed and engine load values. It will be noted that in this table the positive ΔPCT values are found in the low speed/low load ranges wherein the exhaust gas temperature is low and the particulate matter will be accumulated in the trap. On the other hand, the negative values are contained in the engine speed/load regions wherein the exhaust gas temperature will be high enough to initiate spontaneous burning and regeneration. Thus, the addition of a negative value results in the appropriate reduction of the SUM value while the addition of a positive value maintains the SUM value indicative of the actually accumulated amount.

It will be noted that as the value of ΔPCT increases with the age and corresponding deterioration of the engine, the values of ΔPCT can be updated in accordance with the total distance traversed by the vehicle, number of engine operating hours, a value derived using operating time and load wherein the time count is increased (weighted) for high load operating condition, or the like.

Following this at step 3S6 the amount of collected particulate matter SUM is updated by adding the just obtained value of ΔPCT. Viz.:

$$SUM = SUM + \Delta PCT \quad (16)$$

It will be noted that this integration is performed at predetermined time intervals (e.g. 2-3 seconds) and that the initial value of SUM is not zero. The reason for this latter feature will be made clear hereinlater.

At step 3S7 the updated SUM value is compared with a predetermined reference value in order to determine if sufficient particulate matter has accumulated to warrant a regeneration or not. If SUM is equal to or greater than the reference value, the routine proceeds to step 3S8 wherein the regeneration required flag is set (F1=1).

At step 3S9 commands are issued which induce the heater 29 to assume a de-energized state (OFF) and the throttle valves 6, 21 and 25 to assume there "initial" or default positions. In other words the system is initialized ready to accept temperature control commands.

After step 3S9 the routine loops back to step 3S1. As a result of the regeneration required flag F1 being set, on the next run the routine flows from step 3S2 to step 3S10 wherein the instant $T_{IN}$ value is compared with $T_1$. In this case $T_1$ is selected to be equal to $T_{REG}$ or 400° C.

In the case $T_{IN} \geq T_1$ the exhaust gas temperature is deemed adequate to initiate combustion without further temperature elevation being required and the routine goes to step 3S12. On the other hand, if $T_{IN}$ is found to be lower than $T_1$ then at step 3S11 the instant $T_W$ value is compared with a predetermined level (e.g. 50° C.). In the event that $T_W$ is equal to or greater than the given level, the routine goes to step 3S13 wherein the heater 29 is energized, and both of the induction and exhaust systems are throttled by closing throttle valves 6 and 21. These measures induce an increase in exhaust gas temperature and induces combustion of the accumulated combustible particulate matter.

However, if $T_W$ is less than the above mentioned level, the routine goes to step 3S14 wherein the three throttle valves 6, 21 and 25 are opened. The reasons for this have been set forth in connection with the first embodiment.

At steps 3S15 and 3S16 a regeneration time value is incrementally increased each time the routine passes through either of the steps. At step 3S17 the current regeneration time value is compared with one indicative of a predetermined time (e.g. 10 seconds). While the count is below the predetermined value, the routine loops back to step 3S1.

Upon the predetermined count being generated in one of steps 3S16 and 3S17 the routine is switched at step 3S17 to flow to step 3S18 wherein the regeneration complete flag F2 is set (F2=1). At step 3S19 the data which has been accumulated during the instant regeneration is deleted and the flag F1 is cleared (F1=0).

On the next run of the program the routine flows from step 3S2 to 3S20 in response to the setting of the regeneration completion flag F2. As step 3S20 it is determined if the required conditions for sampling the pressure differential ΔP exist or not. In this case it is required that the engine speed and load be equal to or greater than predetermined values and the time since the last sampling exceed a predetermined limit (e.g. 20 second). While these conditions are not met the routine loops back to step 3S1 via step 3S9.

Upon the requisite conditions for sampling are found to exist the routine proceed to step 3S21 wherein the output of the pressure differential sensor 31 is sampled and set in memory. The value is then corrected for engine coolant temperature using the following equation:

$$\Delta P = \Delta P \times K_{TW} \quad (17)$$

Figure 19:
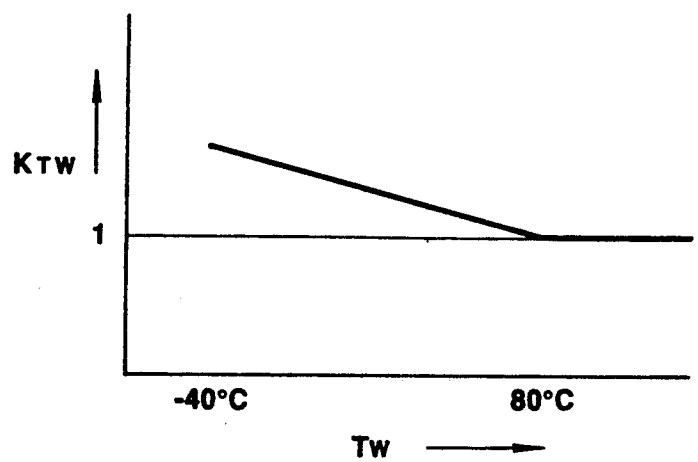

In this case the coolant temperature correction factor $K_{TW}$ can be obtained by look-up using tabled data of the nature shown in FIG. 19. The reason for this correction is that the temperature of the exhaust gases tend to reduce at low coolant temperatures, thus inducing a reduction in the value of ΔP.

Figure 20:
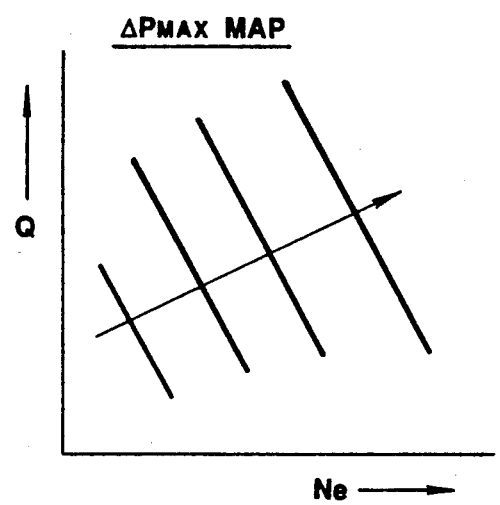
Figure 21:
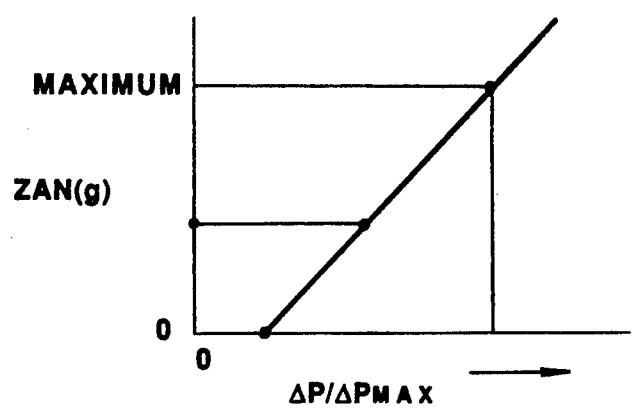

At step 3S22 a ΔPmax value is obtained by table look-up using data of the nature depicted in FIG. 20, a ΔP/ΔPmax ratio is derived and the resulting ratio used in a table look-up to obtain a ZAN value. As will be appreciated the value of ZAN increases with the value of the ΔP/ΔPmax ratio.

At step 3S23 it is determined if the appropriate number of ZAN samples (e.g. 4 samples) have been recorded or not. When the appropriate number has been collected the routine flows to step 3S23 wherein a statistical process including the calculating of a weighted average, is carried out. More specifically, the first sample is set in memory as follows:

$$ZAN1 = ZAN1 \quad (18)$$

Following this, the weighted average of the ZAN1 value is used with the second value to derive a weighted ZAN2 value:

$$ZAN2 = (3ZAN1 + ZAN2)/4 \quad (19)$$

Similarly, weighted ZAN3 and ZAN4 values are derived:

$$ZAN3 = (3ZAN2 + ZAN3)/4 \tag{20}$$

$$ZAN4 = (3ZAN3 + ZAN4)/4 \tag{21}$$

The weighted ZAN4 value is stored in memory as the initial value of SUM.

At step 3S26 flag F2 is cleared.

In summary, the above embodiment is such that the regeneration efficiency can be inferred from the pressure differential which exists across the trap 3 following a regeneration. The amount of particulate matter which remains in the trap following a regeneration is calculated based on the regeneration efficiency and is used as the initial value of SUM in the next regeneration.

FOURTH EMBODIMENT

Figure 22:
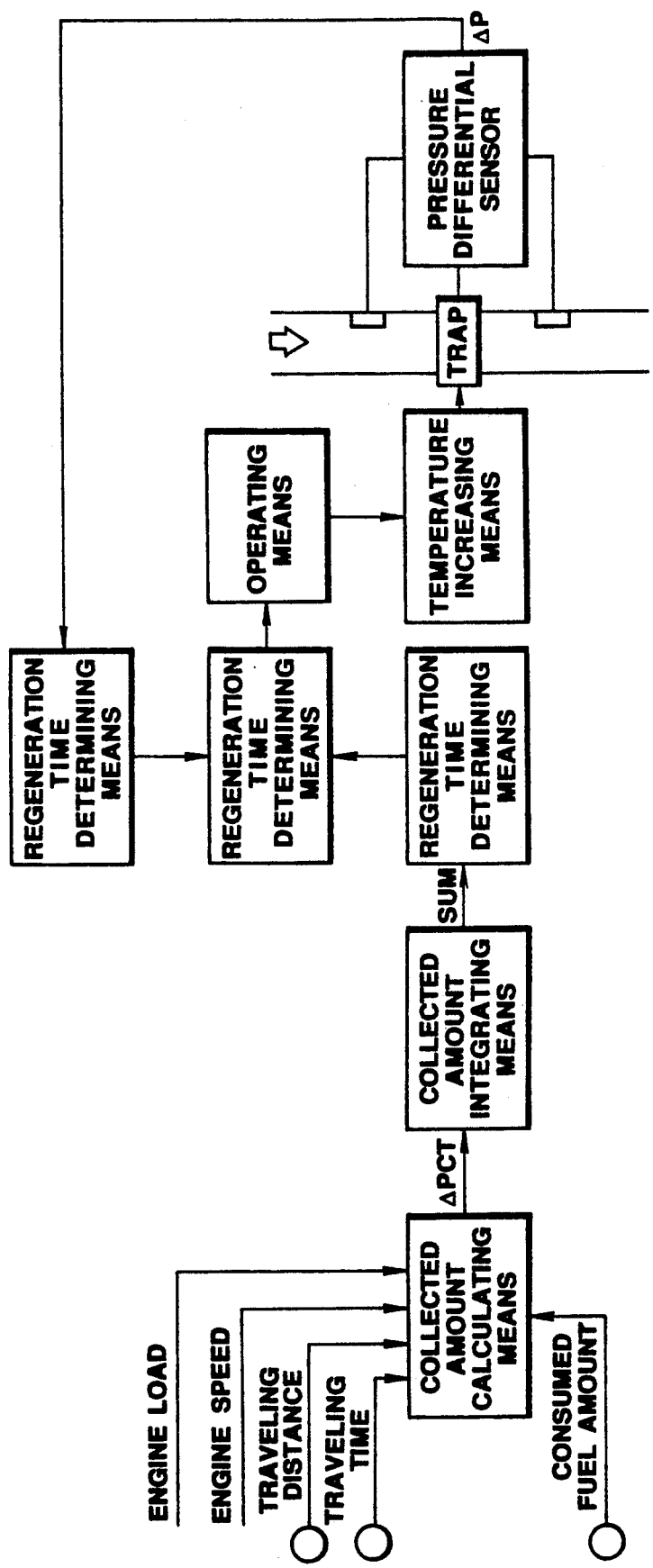
FIG. 22 is a block diagram showing the conceptual arrangement of a fourth embodiment of the present invention.

FIG. 22 shows the conceptual arrangement of a fourth embodiment of the present invention. As will be appreciated from this figure, the instant embodiment is such as to make use of data such as the distance travelled by the vehicle, the travelling time and the amount of fuel consumed. Although not specifically shown in FIG. 2, it will be understood that this data can obtained from the vehicle odometer, a clock incorporated in the control unit 41, fuel flow meter and the like. As the number of techniques of obtaining the above mentioned data will be obvious to those skilled in the art of automotive engineering and engine control, no further disclosure is deemed necessary.

This embodiment features the arrangement wherein the regeneration initiation timing (regeneration interval) is based on an empirically derived schedule which has been obtained using the particulate matter accumulation and pressure differential histories. In other words for each type of engine (and/or trap) the manner data has been recorded and these statistics or "history" used to develop a schedule which reflects the intervals at which regeneration is required.

Before proceeding with a detailed description of the flow chart which depicts the operations performed by a control program it is deemed appropriate to outline some of the major aspects of the instant embodiment.

(1) Pressure dependent regeneration interval

The pressure differential ΔP is sampled at predetermined intervals and the frequency with it exceeds a predetermined limit ΔPmax is used an indication that regeneration is necessary is produced when the frequency exceeds a preselected limit.

As will be appreciated, the ΔP value is dependent on the amount of particulate matter (PCT) and ash which is collected in the trap.

Figure 23:
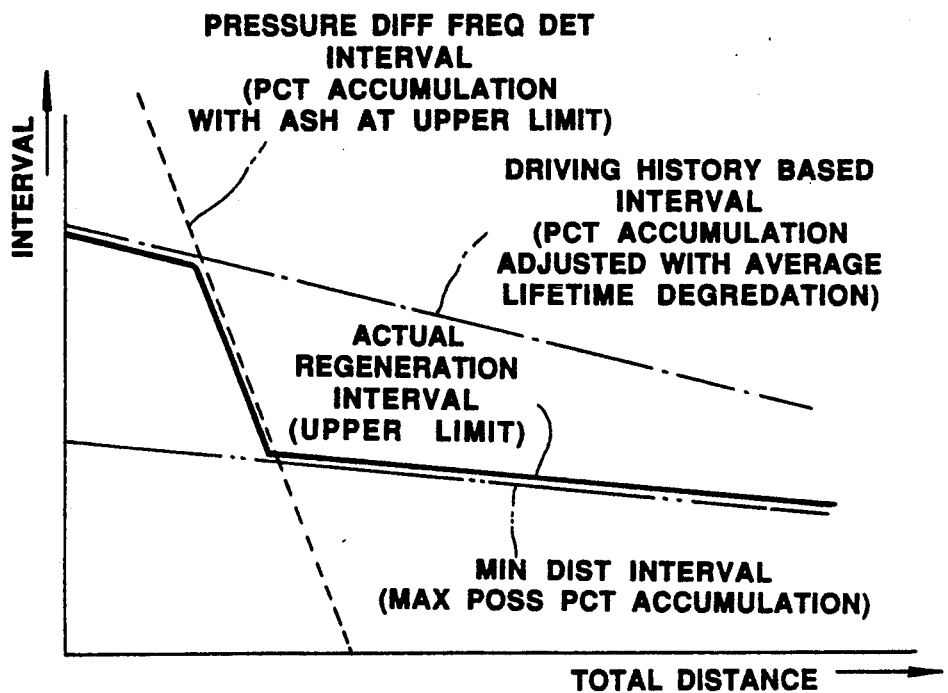
Figure 24:
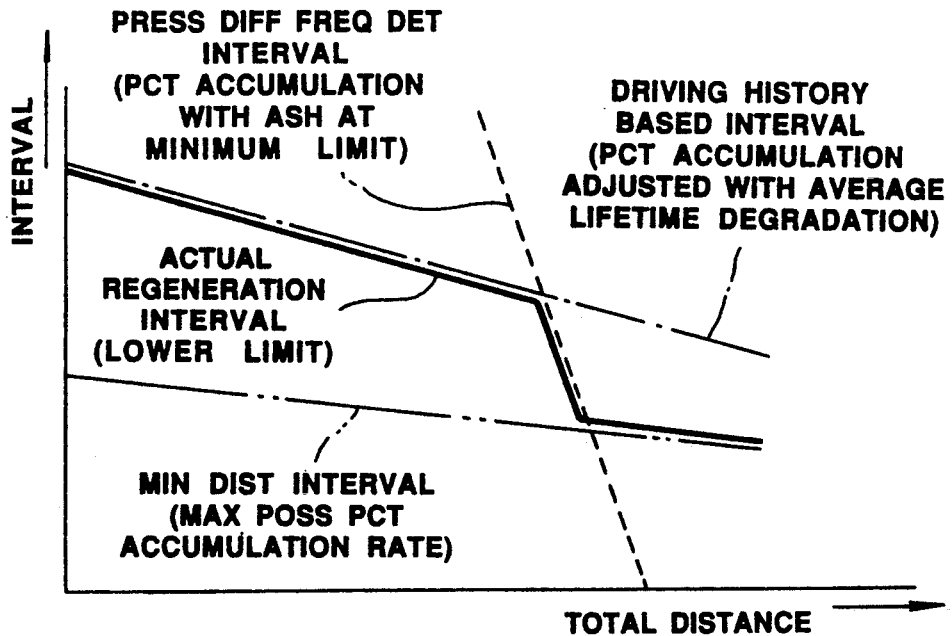

The intervals at which regenerations are indicated as being required using this technique are depicted by the chain line traces in FIGS. 23 and 24. The trace in FIG. 24 denotes the timing which is obtained when the amount of incombustible ash which is accumulated in the trap is at a low level while the trace in FIG. 23 denotes the timing which is obtained when the amount of ash is at an upper limit. As will be appreciated as the amount of ash in the trap increases the intervals indicated as being necessary by the pressure differential, decrease.

(2) Accumulation dependent regeneration interval

The amount of particulate matter accumulated per unit time ΔPCT is derived based on the engine speed and engine load values Ne, Q. The ΔPCT values are integrated at predetermined time intervals. When the sum (SUM) exceeds a preselected value, the point where a regeneration is required is reached. The change in this parameter is indicated by the single dot line in FIGS. 23 and 24.

(3) Accumulation dependent regeneration interval (at max possible accumulation rate)

The two dot lines in FIGS. 23 and 24 indicate the "minimum" distance in which the collected particulate matter amount is deemed to reach its upper limit at the maximum possible accumulation rate. This minimum distance cannot be reduced as it represents the distance in which a full charge of particulate matter will be accumulated under the most severe operating conditions (viz., conditions wherein the amount of particulate matter in the exhaust gases maximize) and the ΔP value will reach its upper limit.

The interval between actual regenerations is selected so as to follow the solid line traces in FIGS. 23 and 24. As will be appreciated, these traces are a "safe side" compromise of the above mentioned three different interval determining parameters. Viz., while the pressure differential dependent threshold is not reached the one dot accumulation trace is followed. Upon the ΔP threshold being encountered the lower of the two values (the pressure related value) is assumed to be the safer. Upon falling to the "worst case" threshold, (two dot trace) the regeneration interval is set in accordance with the same.

As the amount of accumulated ash increases, the step in the traces moves from the position shown in FIG. 24 toward that shown in FIG. 23.

Figure 25A:
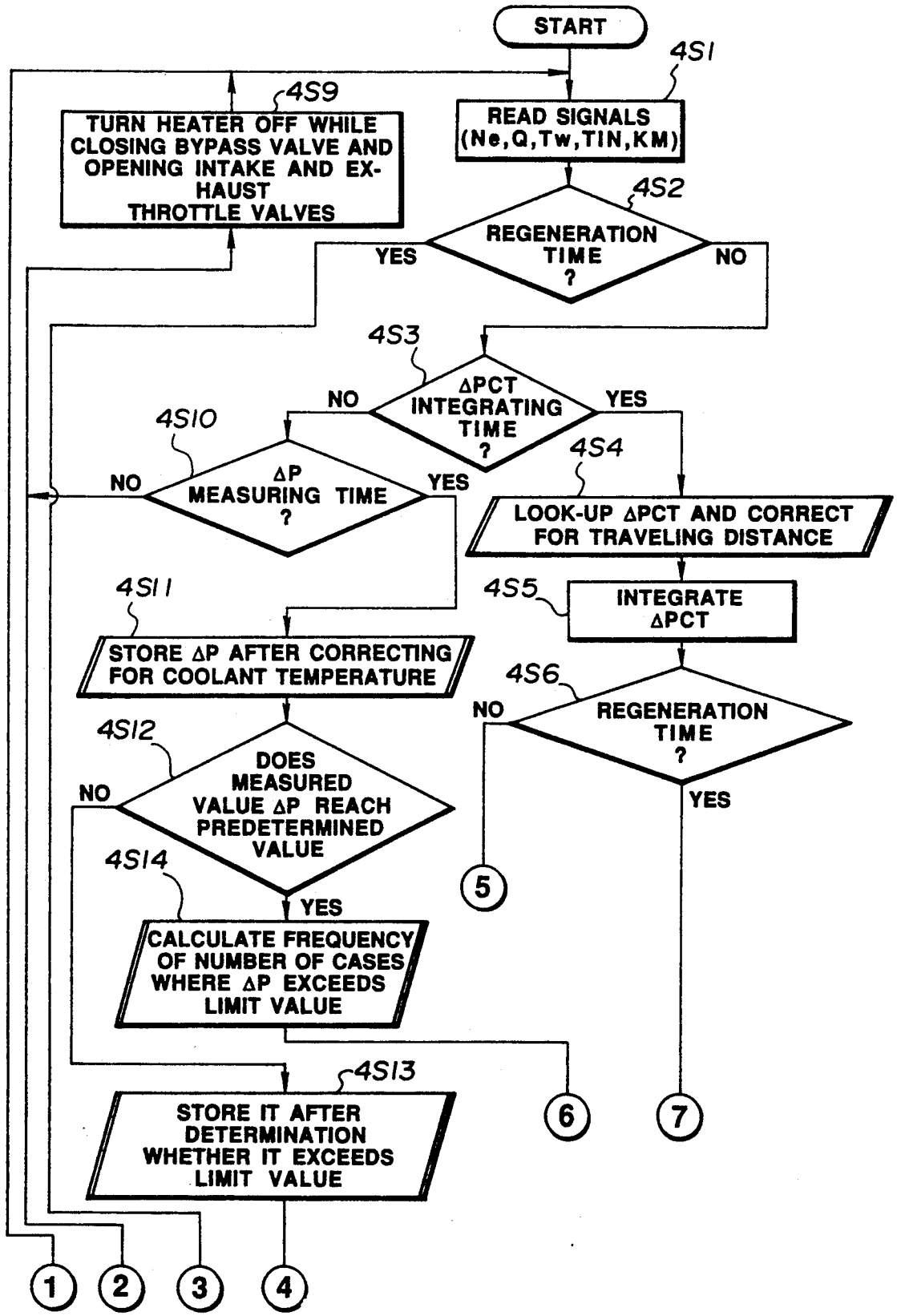

Although not specifically shown in the flow chart of FIGS. 25A and 25B, it is within the scope of the present invention to utilize a sub-routine which updates the schedules shown in FIG. 24 in a manner wherein it tends toward that shown in FIG. 23. In other words, it is possible to develop a ZAN value (disclosed above in connection with the third embodiment of the present invention) by sampling the pressure differential after a regeneration and to determine how much incombustible residue has accumulated. Depending on the ZAN value the position of the chain line trace can be moved from that shown in FIG. 24 toward that illustrated in FIG. 23. This of course allows for the fact that the trap will tend to reach a fully charged state earlier than normal due to the incombustible residue, by increasing the frequency with which regenerations are carried out.

It should be noted that the total distance parameter of FIGS. 23 and 24 can take the form of total distance travelled by the vehicle, the total amount of engine running time, the total amount of fuel consumed or a suitable factor derived from a combination of two or more of the same. Likewise the "interval" between regenerations is not necessarily limited to time and can be distance, engine running time, consumed fuel or the like as deemed appropriate.

The first two steps of the flow chart shown in FIGS. 25A and 25B is the same as those disclosed in connection with the routine depicted in FIGS. 10A and 10B. Viz., the various data is read in, and the status of a flag which is checked when it is time to regenerate the trap 3, in order to determine if it is time to initiate a regeneration or not.

As step 4S3, it is determined if it is time for the ΔPCT value to be integrated or not.

Figure 26:
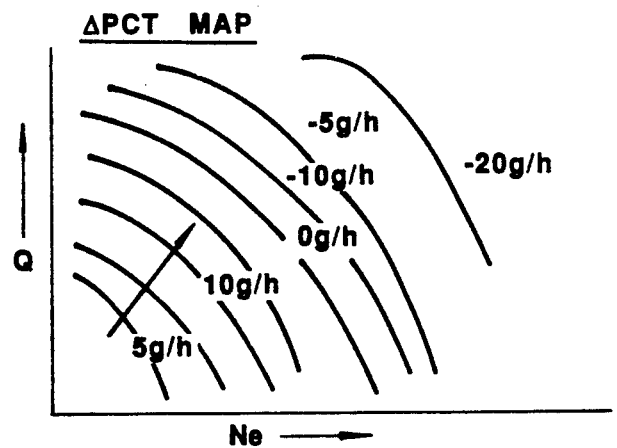
FIGS. 26-30 depict tabled data which is used in connection with the fourth embodiment.

At step 4S4 the amount of collected particulate matter ΔPCT per unit time is obtained via table look-up. FIG. 26 shows an example of tabled data which can be used to provide the appropriate ΔPCT value for the instant set of engine speed and engine load conditions. As will be noted, this map is similar to that shown in FIG. 18. Viz., in this table the positive ΔPCT values are found in the low speed/low load ranges wherein the exhaust gas temperature is low and the particulate matter will be accumulated in the trap. On the other hand, the negative values are contained in the engine speed/load regions wherein the exhaust gas temperature will be high enough to initiate spontaneous burning and regeneration. Thus, the addition of a negative value results in the appropriate reduction of the SUM value while the addition of a positive value maintains the SUM value indicative of the actually accumulated amount.

In this step the ΔPCT map value which is obtained by look-up is also corrected for the amount of distance travelled (e.g. the vehicle in which the motor in question is mounted) using the following equation:

$$\Delta PCT = \Delta PCT_{map} \times K_{DIS} \quad (24)$$

Figure 27:
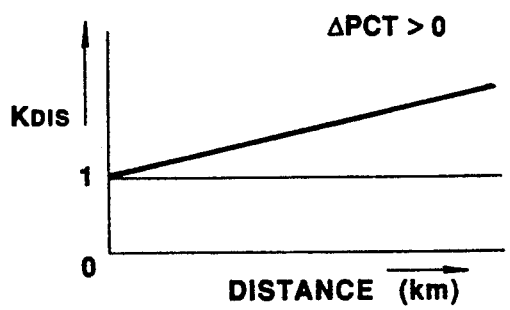
Figure 28:
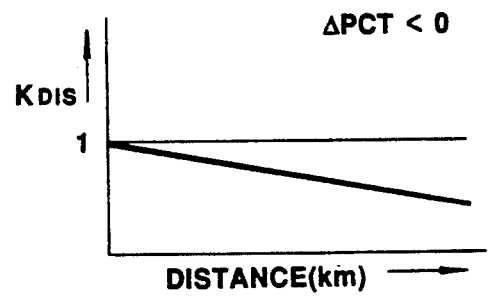

The correction factor $K_{DIS}$ is obtained from one of two sets of mapped data. In the case the value of ΔPCT map is positive the data depicted in FIG. 27 is used while in the case the instant value of ΔPCT map is negative, the data depicted in FIG. 28 is used. The reason for this is the value of ΔPCT changes as the engine ages and and this type of correction is deemed appropriate in order to maintain the accuracy of the system over a prolonged period.

At step 4S5 the collected particulate amount is integrated:

$$SUM = SUM + \Delta PCT \quad (25)$$

At step 4S6 the just obtained SUM value is compared with a reference value. In the event that SUM < the reference value it is time to regenerate the trap 3 and the routine accordingly flows to step 4S7. At this step it is determine if the distance travelled is greater than the "minimum" value permitted at the maximum possible particulate collection rate (viz., it is determined if the threshold denoted by the two dot line in FIGS. 23 and 24 is reached or not).

In the event that such a limit has been reached the program flows to step 4S8 wherein a regeneration required flag F1 is set and then goes on to step 4S9 wherein the settings of the heater 29 and the three throttle valves 6, 21 and 25 are all set to their predetermined initial default values.

On the other hand, if the outcome of step 4S3 is negative, then the routine flows to step 4S10. It will be noted that steps 4S10 to 4S15 are such as to determine the regeneration time. In more detail, at step 4S10 it is determined if it is time to sample the pressure differential or not. In the outcome is affirmative, then the routine flows to step step 4S11. It will be noted that samples are taken at uniform time intervals of ΔT2 which is set in the order of several seconds.

Figure 29:
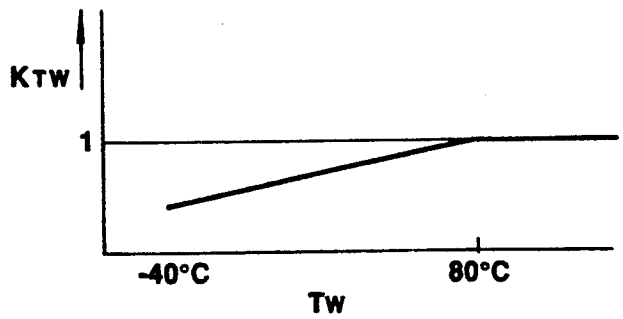

In step 4S11 the instant ΔP value is corrected for coolant temperature and set in memory. Viz., $$\Delta P = \Delta P \times K_{TW} \quad (26)$$

where $K_{TW}$ is a coolant correction factor which is obtained from tabled data of the nature shown in FIG. 29.

At steps 4S12 to 4S14 statistical processes are conducted in order to obviate the effect of misleading fluctuations in the output of the pressure sensor 31 which tend to occur during transient modes of engine operation and the effect of the accumulating amount of ash in the trap. At step 4S12 it is determined if a sufficient number of pressure differential samples have been taken or not. For example, when the number N exceeds 32, the routine is directed to flow to 4S13. At this step a limit value ΔPmax is looked and it is determined if the sampled value ΔP exceeds the ΔPmax limit and the outcome is stored. In this embodiment the microprocessor included in control unit 41 is provided with N number of memory addresses.

Figure 30:
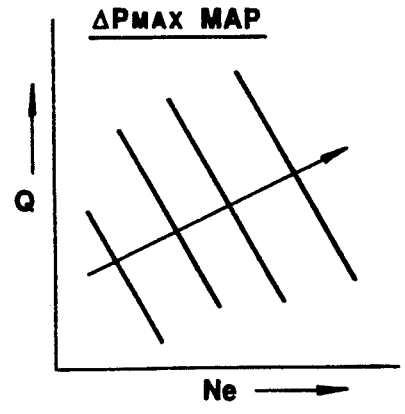

FIG. 30 denotes mapped data from which the value of ΔPmax is determined. As shown this data is logged in terms of engine speed and engine load.

At step 4S14 the number of ΔP values which exceed the ΔPmax limit are counted and count CNT is compared with N in order to derive the frequency with which the pressure differential exceeded the permissible limit. Viz.

$$Freq = CNT/N \quad (27)$$

At step 4S15, if the CNT/N value is compared with a predetermined reference value. In the event that CNT/N > Ref. regeneration is indicated as being necessary and routine goes to step 4S7. As mentioned above if the "minimum" distance value is exceeded then the routine flows to step 4S8 wherein F1 is set.

Following a setting of F1=1 the routine flows from step 4S2 to step 4S16. At this step the trap inlet temperature $T_{IN}$ is compared with $T_1$ (e.g. 400° C.). In the case $T_{IN} \geq T_1$ the trap 3 can be expected to spontaneously regenerate and the routine goes to step 4S18. However, if $T_{IN} < T_1$ then at step 4S17 wherein it is determined if the coolant temperature $T_W$ is above a given level (e.g. 50° C.) or not. In the event of an affirmative outcome, the routine goes to step 4S19 wherein commands which energize the heater 29, and induce throttling of the both the induction and exhaust system. In response to these measures the temperature of the exhaust gases entering the trap are raised to the level whereat regeneration is induced.

However, if $T_W$ is less than the predetermined value then the routine flows to step 4S20 wherein the heater is de-energized and all of the throttle valves 6, 21 and 25 are opened.

At steps 4S21 and 4S22 the regeneration time is monitored. When the count exceeds a value indicative of a predetermined time (e.g. 10 seconds) it is assumed that regeneration will have been completed and the routine is then guided to step 4S24 wherein the data which has been utilized in the instant regeneration process, is erased. This includes clearing the regeneration required flag F1. It will be noted that although ΔPCT has been disclosed as being derived using engine speed Ne and engine load Q, it is within the scope of the instant embodiment to use distance travelled, the amount of fuel consumed or the like parameters which have a direct relationship with the amount of particulate matter which is produced.

Further, the apparatus for elevating the exhaust gas temperature is not limited to the disclosed arrangements and any suitable measures/apparatus for elevating the temperature can be employed.

It should be noted that although the instant embodiment features a fixed regeneration time it is possible to utilize the technique employed in the first embodiment to terminate the regeneration as soon as it is determined that the accumulated matter has been reburnt.

The various possible combinations of the above described embodiments and the variants thereof which will be obvious to those skilled in the instant art, are deemed well within the purview of the engineer skilled in the art of engine control.

What is claimed is:

1. An exhaust gas purifying system for an internal combustion engine, comprising:
   a trap which is disposed in an exhaust conduit and in which particulate matter contained in gases which flow through said conduit, can be collected;
   sensor means for sensing parameters which are related to the conditions which prevail in said trap;
   means for deriving an approximation of the amounts of particulate matter simultaneously collected and burnt respectively in said trap based on outputs from said sensor means; and
   means for selectively increasing the temperature in said trap to a level whereat combustion of the combustible fraction of the particulate matter collected therein is induced, in the event that said sensor means indicates that (a) a regeneration is indicated as being required and (b) the temperature of the gases entering the trap are insufficient to induce spontaneous combustion.

2. An exhaust purifying system for use with an internal combustion engine, comprising:
   a first engine speed sensor;
   a second engine load sensor;
   a third engine coolant temperature sensor;
   an induction passage;
   a first servo controlled flow control valve disposed in said induction passage for restricting the amount of air passing therethrough;
   an exhaust conduit;
   a second servo controlled flow control valve disposed in the exhaust conduit for restricting the flow of gas therethrough;
   a trap disposed in said exhaust conduit downstream of said second valve, said trap including a filter element which is arranged to separate and collect particulate matter contained in the gases which flow through the exhaust conduit;
   a heater disposed in said trap immediately upstream of said filter element;
   a by-pass passage having an upstream end fluidly communicated with said exhaust passage at a location upstream of said second valve and a downstream end communicating with said exhaust passage at a location downstream of said trap;
   a third servo controlled flow valve disposed in said by-pass passage for restricting the flow of gas therethrough;
   a fourth temperature sensor for sensing the temperature of the gases entering said trap;
   a fifth temperature sensor for sensing the temperature of the gases coming out of said trap;
   a sixth pressure differential sensor for sensing a pressure differential which prevails across the upstream and downstream ends of said trap;
   a control unit operatively connected with said heater, said first to sixth sensors and said first to third flow control valves, said control unit including circuitry which includes means for:
   deriving an approximation of the amount of particulate matter collected in said trap during regeneration base on output from said sensor means; and
   selectively operating said heater and said first to third flow control valves in a manner which increases the temperature in said trap to a level whereat combustion of the combustible fraction of the particulate matter collected therein is induced, in the even that (a) a regeneration is indicated as being required and (b) the temperature of the gases entering the trap are insufficient to induce spontaneous combustion.

3. A method of operating an exhaust gas purifying system which comprises a trap in which particulate matter contained in the gases exhausted from an internal combustion engine can be collected, comprising the steps of:
   sensing engine speed using a first sensor;
   sensing engine load using a second sensor;
   sensing the temperature of the engine coolant using a third sensor;
   separating and collecting particulate matter in the gases which flow through the exhaust gas conduit, using said trap;
   sensing the temperature of the exhaust gases at the upstream and downstream ends of the trap using fourth and fifth sensors;
   sensing the pressure differential which develops between the upstream and downstream ends of the trap using a sixth sensor;
   using the outputs of at least one of said first to sixth sensors to derive an approximation of the amount of particulate matter collected in said trap during regeneration; and
   selectively increasing the temperature of the exhaust gases in the event that regeneration is indicated as being required and the temperature of the gases entering the trap are insufficient to induce spontaneous combustion.

4. A exhaust gas purifying system comprising:
   a trap in which particulate matter contained in the gases exhausted from an internal combustion engine is separated and collected;
   first sensor means for sensing engine speed;
   second sensor means for sensing engine load;
   third sensor means for sensing the temperature of the engine coolant;
   fourth sensor means for sensing the temperature of the exhaust gases at the upstream and downstream ends of the trap;
   fifth sensor means for sensing the pressure differential which develops between the upstream and downstream ends of the trap;
   means for using the outputs of at least one of said first to fifth sensor means to derive an approximation of the amount of particulate matter collected in said trap during regeneration; and
   means for selectively increasing the temperature of the exhaust gases in the event that regeneration is indicated as being required and the temperature of the gases entering the trap are insufficient to induce spontaneous combustion.

5. In an exhaust purifying system wherein a trap is used to separate and collect particulate matter contained in the gases exhausted from an internal combustion engine:

means for sensing the trap containing a predetermined amount of particulate matter and for implementing measures which raise the temperature of the exhaust gases to a level whereat the particulate matter will undergo reburning;

means for determining which of a plurality of engine speed/load zones an engine associated with the exhaust purifying system is operating in;

means for approximating the amount of particulate matter which is being produced per unit time and which will be collected in the trap based upon the engine speed/load zone the engine is determined to be operating in;

means for sensing the temperature of the gases being exhausted from the trap and for approximating the amount of particulate matter which is being reburnt per unit time;

means for determining the effective reduction in particulate matter contained in the trap based on the amount of particulate matter which is being produced per unit time and the amount of particulate matter which is being reburnt per unit time, and for determining when the amount of particulate matter contained in the trap has been reduced to a predetermined level and when the measures which raise the temperature of the exhaust gases to a level whereat the particulate matter will undergo reburning, can be stopped.

6. In an exhaust purifying system wherein a trap is used to separate and collect particulate matter contained in the gases exhausted from an internal combustion engine:

means for increasing the temperature of the exhaust gases to a predetermined level whereat combustion of the combustible particulate matter which is collected in said trap, is induced;

means for monitoring a predetermined operational parameter and for estimating, based on the monitored parameter, the amount by which the particulate matter in the trap is selectively reduced per unit time during regeneration;

means for integrating the amount by which the particulate matter in the trap is reduced per unit time and for estimating when a predetermined amount of particulate matter has been burnt; and means for stopping the temperature increase when it is estimated that the predetermined amount of particulate matter has been burnt.

7. An exhaust gas purifying system as claimed in claim 1 further comprising:

means for integrating the difference between the amounts of particulate matter collected and reburnt, and determining that regeneration is complete when the integration reaches a predetermined value.

8. An exhaust gas purifying system as claimed in claim 1 further comprising:

means for determining the pressure differential which exists across the trap when regeneration is determined as being complete, and using the sensed pressure differential with a predetermined limit value to determine a ratio; and means for using the ratio to determine the amount of unburnt particulate retained in the trap following a regeneration.

9. An exhaust gas purifying system as claimed in claim 8 further comprising:

means for using said ratio as a base value to which the amount of particulate matter which is collected, is added.

10. An exhaust gas purifying system as claimed in claim 2, wherein said control unit further includes:

means for determining if the engine associated with the purifying system is operating in a first mode which will produce an exhaust gas temperature sufficiently high enough to induce reburning of the particulate matter collected in the trap;

means for determining if the engine associated with the purifying system is operating in a second mode which will produce an exhaust gas temperature insufficiently high to induce reburning of the particulate matter collected in the trap;

means for decreasing an accumulation value indicative of the amount of particulate matter retained in the trap when the engine is determined to be operating in said first mode and for increasing the accumulation value when the engine is determined to be operating in said second mode; and means for determining that trap regeneration is required when the accumulation value reaches a predetermined limit.

11. An exhaust gas purifying system as claimed in claim 2 further comprising:

means responsive to at least one of said first to fifth sensors for estimating the amount of particulate matter which is accumulated in said trap and for issuing a first indication that trap regeneration is necessary when the estimated amount reaches a predetermined value;

means responsive to said sixth sensor for indicating that a predetermined amount of particulate matter has accumulated in said trap and issuing a second indication that trap regeneration is necessary;

means for determining a first period with which said first indication is issued;

means for determining a second period with which said second indication is issued; and regeneration trigger means which is responsive to the shorter of the first and second periods.

* * * * *